(12) United States Patent
Lee et al.

(10) Patent No.: US 10,042,689 B2
(45) Date of Patent: Aug. 7, 2018

(54) MOBILE TERMINAL AND METHOD OF CONTROLLING THE SAME

(71) Applicant: LG ELECTRONICS INC., Seoul (KR)

(72) Inventors: Jaehwa Lee, Seoul (KR); Hyerim Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 15/187,718

(22) Filed: Jun. 20, 2016

(65) Prior Publication Data

US 2017/0046214 A1 Feb. 16, 2017

(30) Foreign Application Priority Data

Aug. 13, 2015 (KR) ........................ 10-2015-0114814

(51) Int. Cl.
| | | |
|---|---|---|
| *G06F 11/00* | (2006.01) | |
| *G06F 11/07* | (2006.01) | |
| *H04M 1/725* | (2006.01) | |
| *G06F 3/0484* | (2013.01) | |
| *G06F 3/0488* | (2013.01) | |
| *G06F 17/30* | (2006.01) | |
| *G06F 9/451* | (2018.01) | |

(52) U.S. Cl.
CPC ........ *G06F 11/0769* (2013.01); *G06F 3/0484* (2013.01); *G06F 3/0488* (2013.01); *G06F 9/453* (2018.02); *G06F 11/0742* (2013.01); *G06F 11/0793* (2013.01); *G06F 17/30253* (2013.01); *H04M 1/72522* (2013.01); *H04M 2250/56* (2013.01)

(58) Field of Classification Search
None
See application file for complete search history.

(56) References Cited

U.S. PATENT DOCUMENTS

| | | |
|---|---|---|
| 6,456,303 B1 | 9/2002 | Walden et al. |
| 2007/0281731 A1 | 12/2007 | Attride et al. |
| 2009/0327184 A1* | 12/2009 | Nishizaki .............. G06F 3/0482 706/46 |
| 2010/0058123 A1* | 3/2010 | Yamashirodani ... G06F 11/0733 714/57 |

(Continued)

OTHER PUBLICATIONS

European Patent Application No. 16173911.5, Extended Search Report dated Dec. 13, 2017, 8 pages.

*Primary Examiner* — Sarai E Butler
(74) *Attorney, Agent, or Firm* — Lee, Hong, Degerman, Kang & Waimey

(57) ABSTRACT

The present invention provides a mobile terminal including a display unit configured to output screen information corresponding to a specific function, and receive a touch for controlling the specific function, and a controller configured to determine whether or not an error has been generated from the specific function, on the basis of changes in the screen information and error information included in the screen information during the control of the specific function, wherein the controller controls the display unit to output a guide image for searching for error data associated with the error when it is determined that the error has been generated.

18 Claims, 23 Drawing Sheets

(56) References Cited

U.S. PATENT DOCUMENTS

| | | | |
|---|---|---|---|
| 2010/0238296 A1* | 9/2010 | Nakamura | G01S 3/7864 348/169 |
| 2010/0241893 A1* | 9/2010 | Friedman | G06F 17/30445 714/2 |
| 2012/0042216 A1* | 2/2012 | Blubaugh | H04L 63/029 714/48 |
| 2013/0063478 A1* | 3/2013 | Seo | G06F 3/0488 345/619 |
| 2013/0205163 A1* | 8/2013 | Dorso | H04L 65/1069 714/4.11 |
| 2014/0026002 A1* | 1/2014 | Haines | G06F 11/0766 714/57 |
| 2014/0129882 A1* | 5/2014 | Harden | G06F 11/0766 714/57 |
| 2014/0189426 A1* | 7/2014 | Ben-Kiki | G06F 11/0793 714/15 |
| 2015/0227409 A1* | 8/2015 | Ricken | G06F 11/0709 714/47.2 |
| 2015/0234728 A1* | 8/2015 | Coleman | G06F 11/324 714/57 |
| 2015/0347265 A1* | 12/2015 | Clements | G06F 11/3476 714/45 |

* cited by examiner

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0114814, filed on Aug. 13, 2015, the contents of which are all hereby incorporated by reference herein in its entirety.

BACKGROUND OF THE INVENTION

1. Field of the Invention

This specification relates to a mobile terminal capable of providing guide information by determining a generation of an error.

2. Background of the Invention

A mobile terminal refers to every device which includes a battery and a display unit, outputs information on the display unit using power fed from the battery, and is portable by a user. The mobile terminal includes a device that records and reproduces videos and a device that displays graphic user interfaces (GUIs), and examples of the mobile terminal include a notebook, a portable phone, glasses and watch capable of displaying screen information, a game machine and the like.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

Accordingly, it is difficult for a user to correctly know how to use those various functions and to correctly use a desired function due to a wrong usage method or an erroneous system. Also, mobile terminal manufacturers do not provide a detailed manual for each function, which cause users' failure of using such function in a correct way.

SUMMARY OF THE INVENTION

Therefore, an aspect of the detailed description is to fast provide guide information for solving an error which is generated during use.

To achieve these and other advantages and in accordance with the purpose of this specification, as embodied and broadly described herein, there is provided a mobile terminal including a display unit configured to output screen information corresponding to a specific function, and receive a touch for controlling the specific function, and a controller configured to determine whether or not an error has been generated from the specific function, on the basis of changes in the screen information and error information included in the screen information during the control of the specific function, wherein the controller controls the display unit to output a guide image for searching for error data associated with the error when it is determined that the error has been generated.

In one exemplary embodiment, the controller may determine that the error has been generated when the screen information is repetitively output or when a notification window notifying the error information is output on the display unit. This may allow the user to solve the error immediately even without executing a specific application.

In one exemplary embodiment, a text image extracted from the notification window may be set to a search term for searching for the error data in response to a continuous touch applied to the notification window and the guide image, or a text extracted from a capture image of the screen image may be set to the search term. This may result in omitting a step of inputting an appropriate search word for searching for the error data.

In one exemplary embodiment, the controller may execute a video call function with an external device and transmit the screen information to the external device when it is determined that the error has been generated. This may allow for the user to ask for help from other user in real time when the error is generated.

In one exemplary embodiment, when the user repetitively outputs the same screen information, it may be determined as an error and a method of more fast executing an application for solving the error can be provided. Also, when the repetitive output screen information is not determined to result from the user's intent, an output of an icon may be restricted so as to improve user convenience in controlling the screen information.

In addition, image or video from which an error has been generated may be stored and a text associated with error information can be extracted and searched for from the image or video, thereby providing more correct error data.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
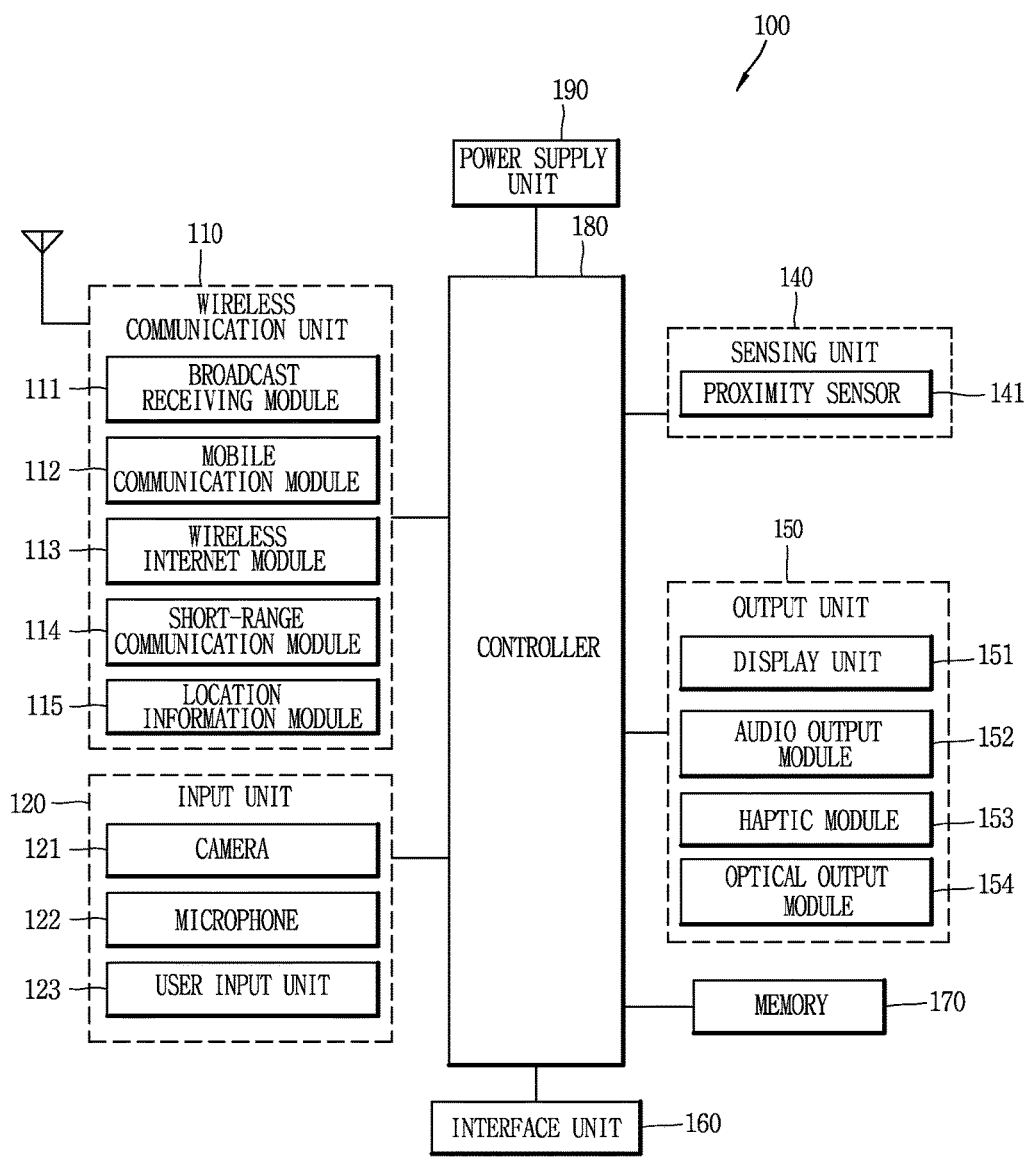
FIG. 1A is a block diagram of a mobile terminal in accordance with one exemplary embodiment of the present invention.
Figure 1B:
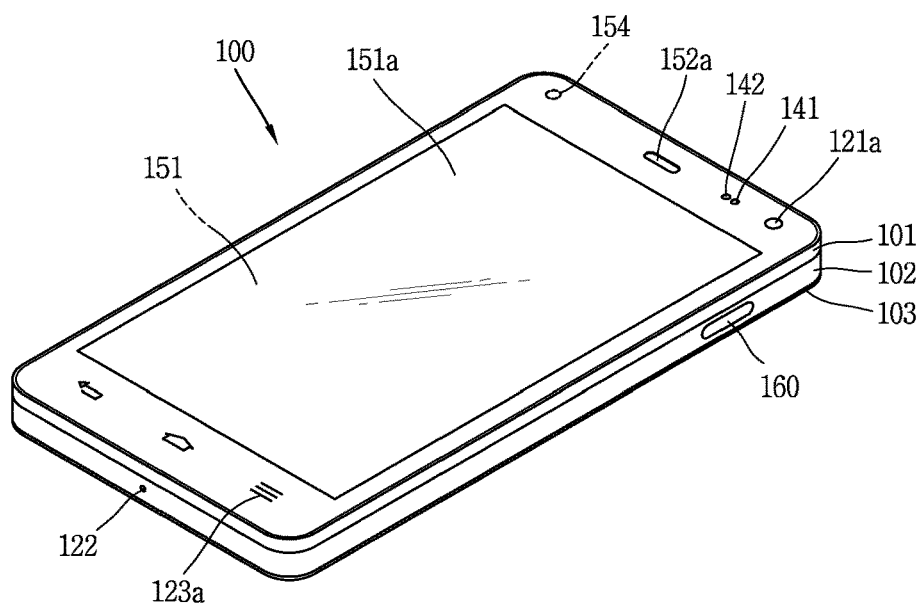
FIGS. 1B and 1C are conceptual views illustrating one example of the mobile terminal, viewed from different directions.
Figure 1C:
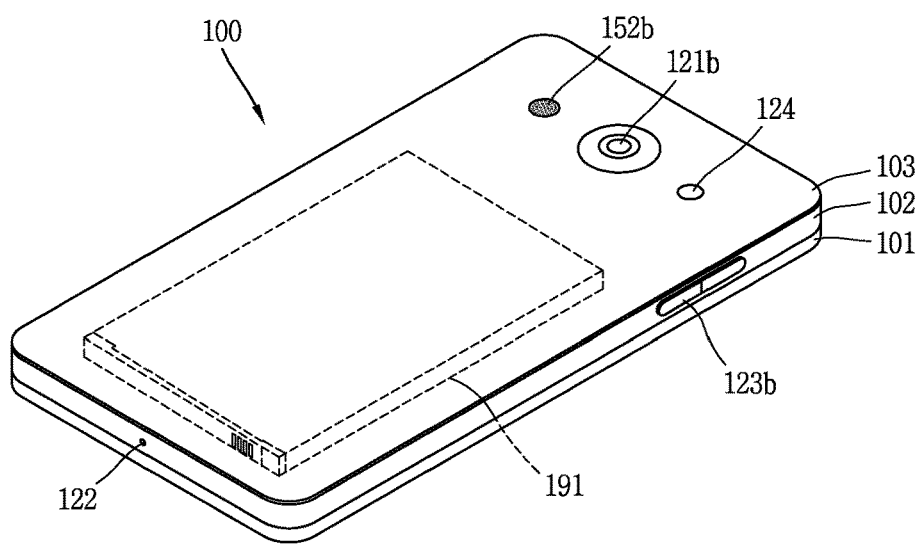

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
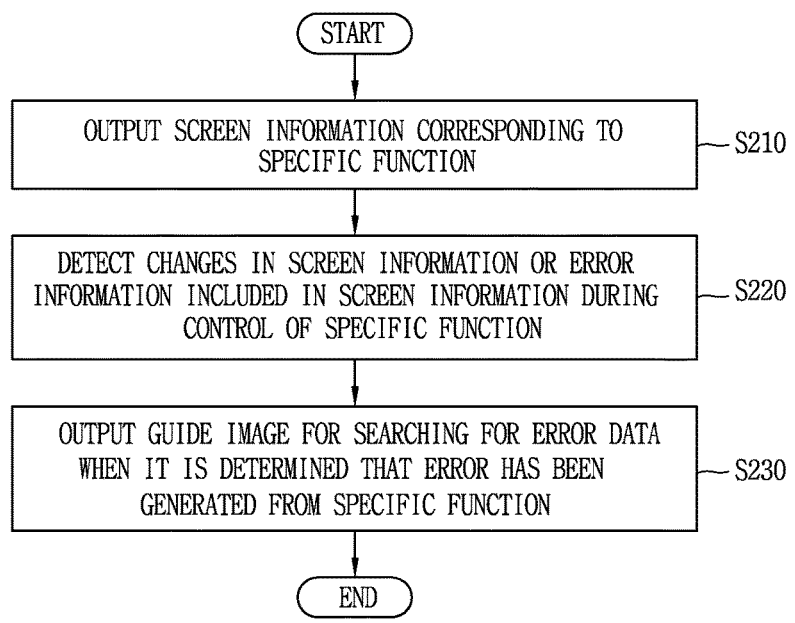
FIG. 2A is a flowchart illustrating a method of controlling a mobile terminal in accordance with one exemplary embodiment of the present invention.
Figure 2B:
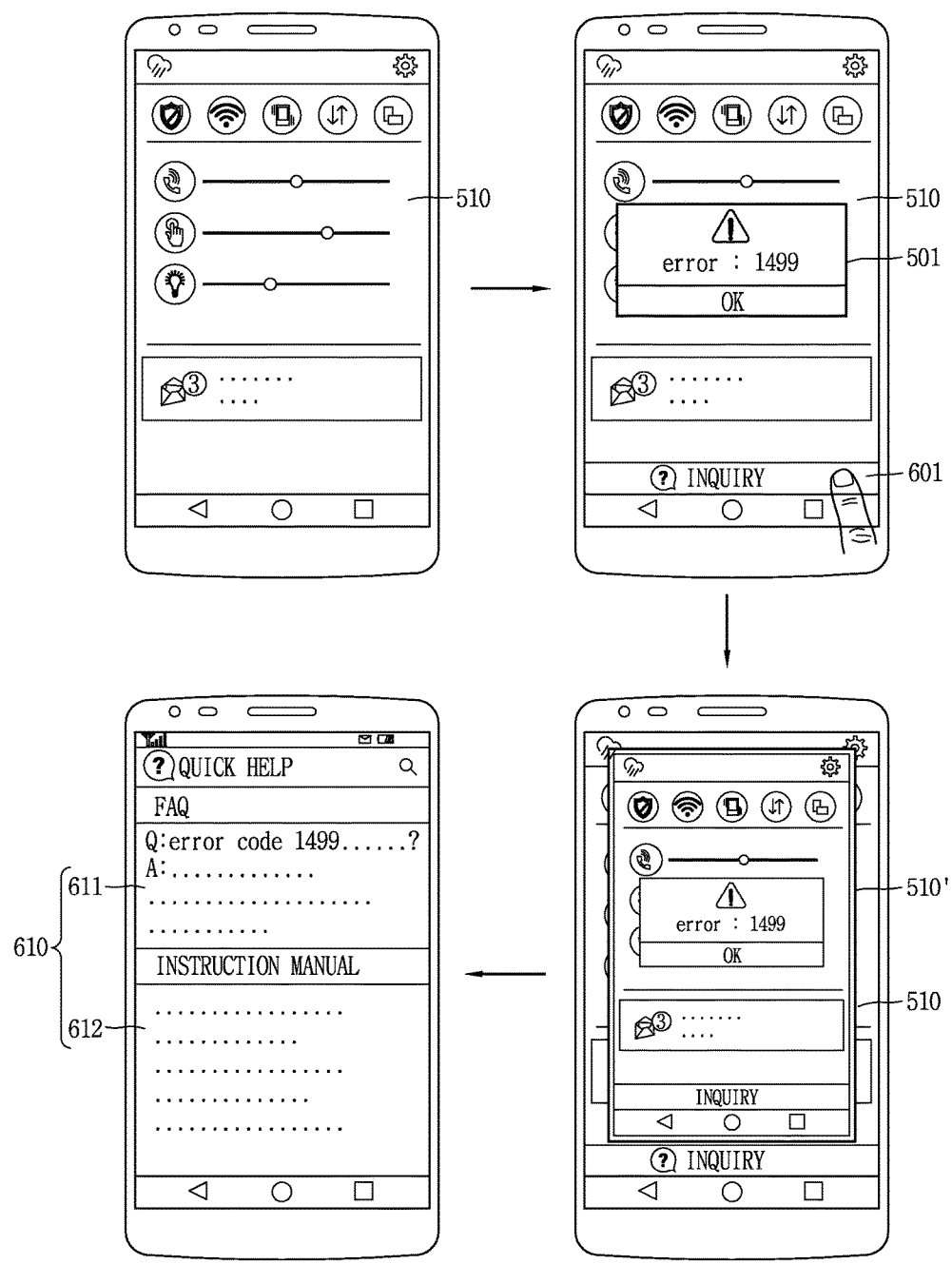
FIGS. 2B-2E are conceptual views illustrating the control method of FIG. 2A.
Figure 2C:
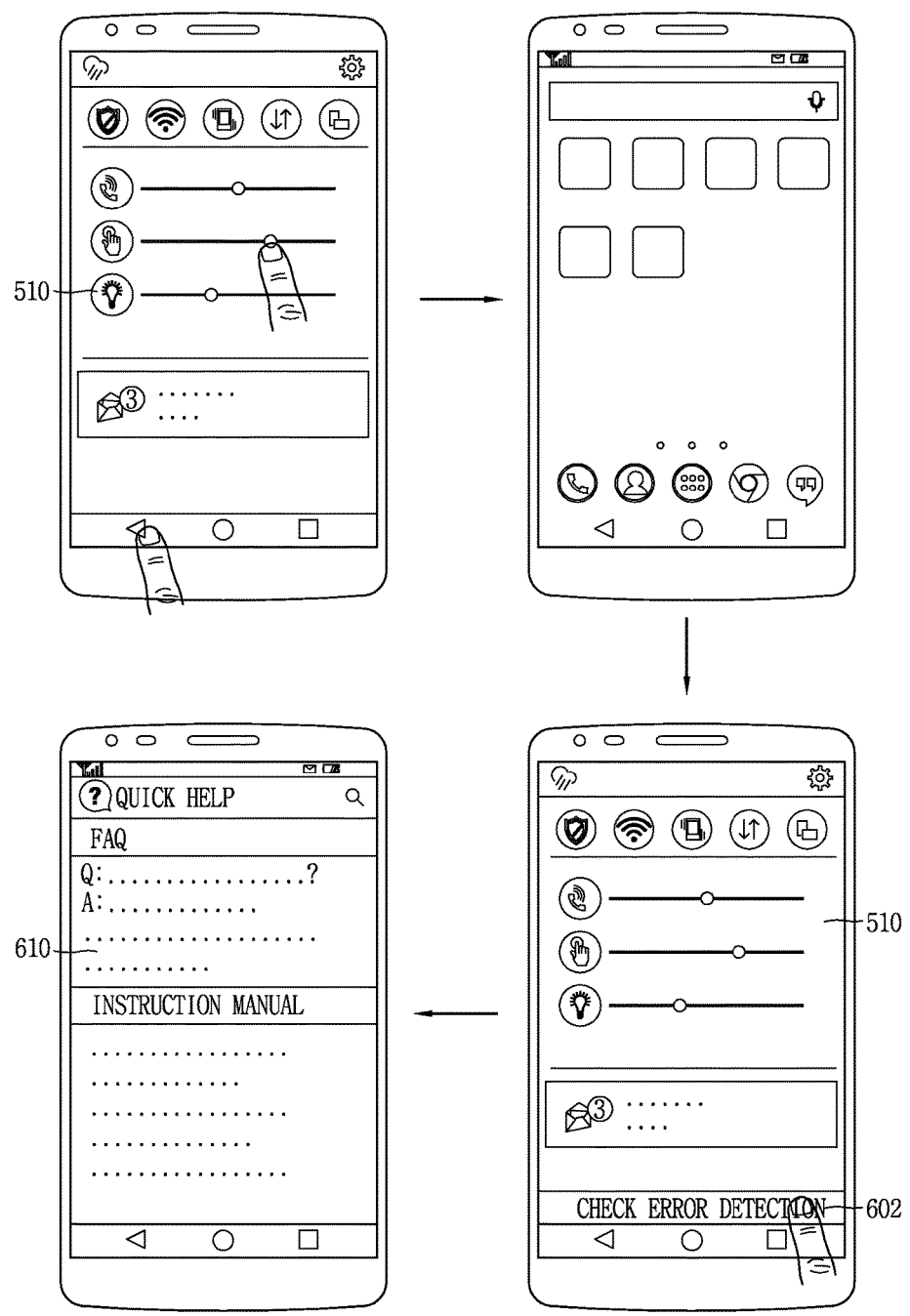
Figure 2D:
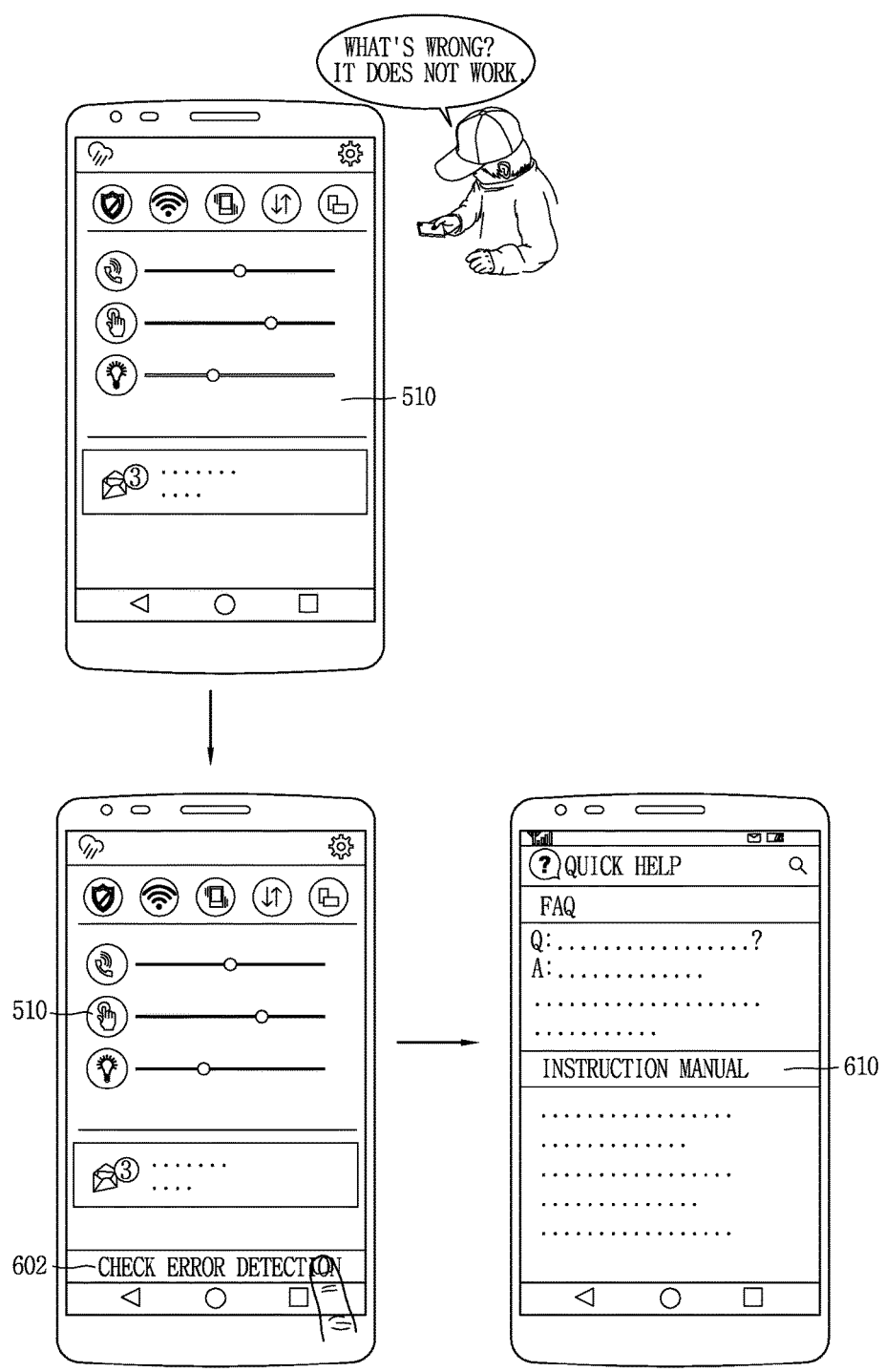

FIG. 2A is a flowchart illustrating a method of controlling a mobile terminal in accordance with one exemplary embodiment of the present invention, and FIGS. 2B to 2D are conceptual views illustrating the control method of FIG. 2A.

The display unit 151 outputs screen information 510 corresponding to a specific function (S210). There is not a limit to a type of the screen information 510. For example, the screen information may be an execution screen of a specific application, a setting screen of a function, a home screen page including icons corresponding to applications, a webpage and the like, with no limit. FIG. 2B illustrates a setting screen for changing settings of components of the mobile terminal.

The controller 180 detects changes in the screen information or error information included in the screen information while controlling the specific function (S220). Here, the error information may include even a situation that a user feels difficult to use the specific function, namely, in case of failing to control the specific function in a desired way, as well as an uncontrollable state and an abnormal (or erroneous) response to an input control command.

As illustrated in FIG. 2B, when an error is generated based on the user's control command while controlling the specific function, the controller 180 controls the display unit 151 to output a notification widow 501 to notify the generation of the error. The notification window 501 may include information related to the specific function, information related to the error, a code number of the error, an identification number of the error, and the like. The notification window 501 may be output on one area of the screen information 510.

Referring to FIG. 2C, when the screen information 510 corresponding to the specific function is repetitively output for a preset time, the controller 180 may determine that the error has been generated from the specific function. For example, when failing to execute the specific function, the user undergoes a process of terminating the specific function and restarting the specific function. In this instance, the display unit 151 repetitively outputs substantially the same screen information. When the same screen information is repetitively output by a preset number of times within a preset time, the controller 180 determines the generation of the error.

When the generation of the error is determined through the notification window 501, the controller 180 controls the display unit 151 to output a first icon 601. The first icon 601 may be output on one area of the display unit 151 at an area adjacent to the notification window 501.

Referring back to FIG. 2B, the controller 180 generates a capture image 510' obtained by capturing the screen information 510 including the notification window 501, in response to a touch applied to the first icon 601. The display unit 151 may output an image indicating the generation of the capture image 510'.

The controller 180 extracts a text (letters, sentence, etc.) from the capture image 510'. For example, the controller 180 may extract "error: 1499," "OK," "inquiry" and the like which are included in the capture image 510'. When the error is determined to have been generated, the controller 180 executes a specific application for solving the error after extracting the terms. The specific application may be executed based on a control command applied by the user. The specific application searches for an error generated in the mobile terminal and provides a search result for the error. The controller 180 provides the search result for the error by receiving it from a specific server or extracting it stored in the memory 170.

The drawings exemplarily illustrate that the application is executed in response to a touch applied to the first icon 601 after the first icon 601 is output, but the present invention may not be limited to this. For example, when the notification window 501 is repetitively output, the specific application may be automatically executed even without the touch applied to the first icon 601.

The controller 180 outputs a guide image for error data search when the error associated with the specific function is determined to have been generated (S230).

When the terms are extracted, the controller 180 may input at least part of the extracted terms as a search term. The controller 180 may selectively set an error-related word(s) of the extracted text to the search term, or selectively set only a text included in the notification window 501 to the search term.

The controller 180 may control the memory 170 to store (or save) the capture image 510' while executing the application.

The controller 180 searches for error data 610 using the search term and outputs the searched error data 610 on the display unit 151. The display unit 151 may output the error data 610 by sorting for each category. For example, the error data 610 may include a first search result 611 indicating explanation of the error searched for based on the search term, and a second search result 612 including a description (or a manual) for solving the error and performing the specific function.

According to the present invention, when a repetitive error is generated, an application for solving the error is executed even without a user's execution of a program for solving the error or the like. This may result in omitting a control step in which the user terminates a specific function and runs an application for solving the error.

Also, since a text for searching for an error is extracted through a capture image including an error generated, the user does not have to directly input such text for searching for the error, which may allow the user to be provided with data for the error in a more convenient manner.

Referring back to FIG. 2C, when the repetitive screen information is output, the controller 180 controls the display unit 151 to output a second icon 602. Although not illustrated in detail, the second icon 602 may disappear from the display unit 151 when a touch is not applied for a specific time or the repetitive output state of the screen information is ended. That it, the controller 180 may determine it as a control by the user's intent, other than the generation of the error.

A shape of the second icon 602 may not be limited to the illustrated. The second icon 602 is preferably output in a shape without overlapping the screen information 510.

The controller 180 executes the specific application in response to a touch applied to the second icon 602. The controller 180 may set a text included in the repetitively-output screen information 510 to the search term, or set a text extracted on the capture image 510' of the screen information 510 to the search term. Also, the controller 180 may generate the error data 610 using additional information related to the application associated with the screen information 510.

According to this embodiment, when the user repetitively outputs the same screen information, it is determined as a generation of an error and a method of fast executing an application for solving the error is provided. Also, when the repetitive screen information is determined to be output by the user's intent, an output of an icon may be limited to improve user convenience in controlling the screen information.

Referring to FIG. 2D, the controller 180 may execute the specific application based on a voice signal applied through the microphone 122. The controller 180 may activate the microphone 122 at a preset time interval and control the activated microphone 122 to receive the user's voice. Or, when specific screen information is output continuously or repetitively, the controller 180 may activate the microphone 122.

The controller 180 analyzes the voice received through the microphone 122. When the received voice matches a preset voice signal, the controller 180 determines that an error has been generated during the execution of the specific function and then executes the application. For example, the voice signal may correspond to a voice speaking a word (or a sentence) relating to an error, a sigh and the like. Also, a voice signal that the user frequently makes (or speaks) when an error is generated may be recorded in the memory 170. When a similar voice signal to the recorded voice signal is input, the controller 180 may determine that the error has been generated.

When the error generation is sensed based on the received voice, the controller 180 may control the display unit 151 to output the second icon 602. The second icon 602 has been described in FIG. 20 and thus description thereof will not be repeated. The display unit 151 outputs the error data 610 in response to a touch applied to the second icon 602.

According to this embodiment, when an error is generated, the generation of the error may be determined based on a voice that the user applies (or speaks) with realizing it. This may allow for providing a method of solving the error even when the user does not intend to solve it.

Figure 2E:
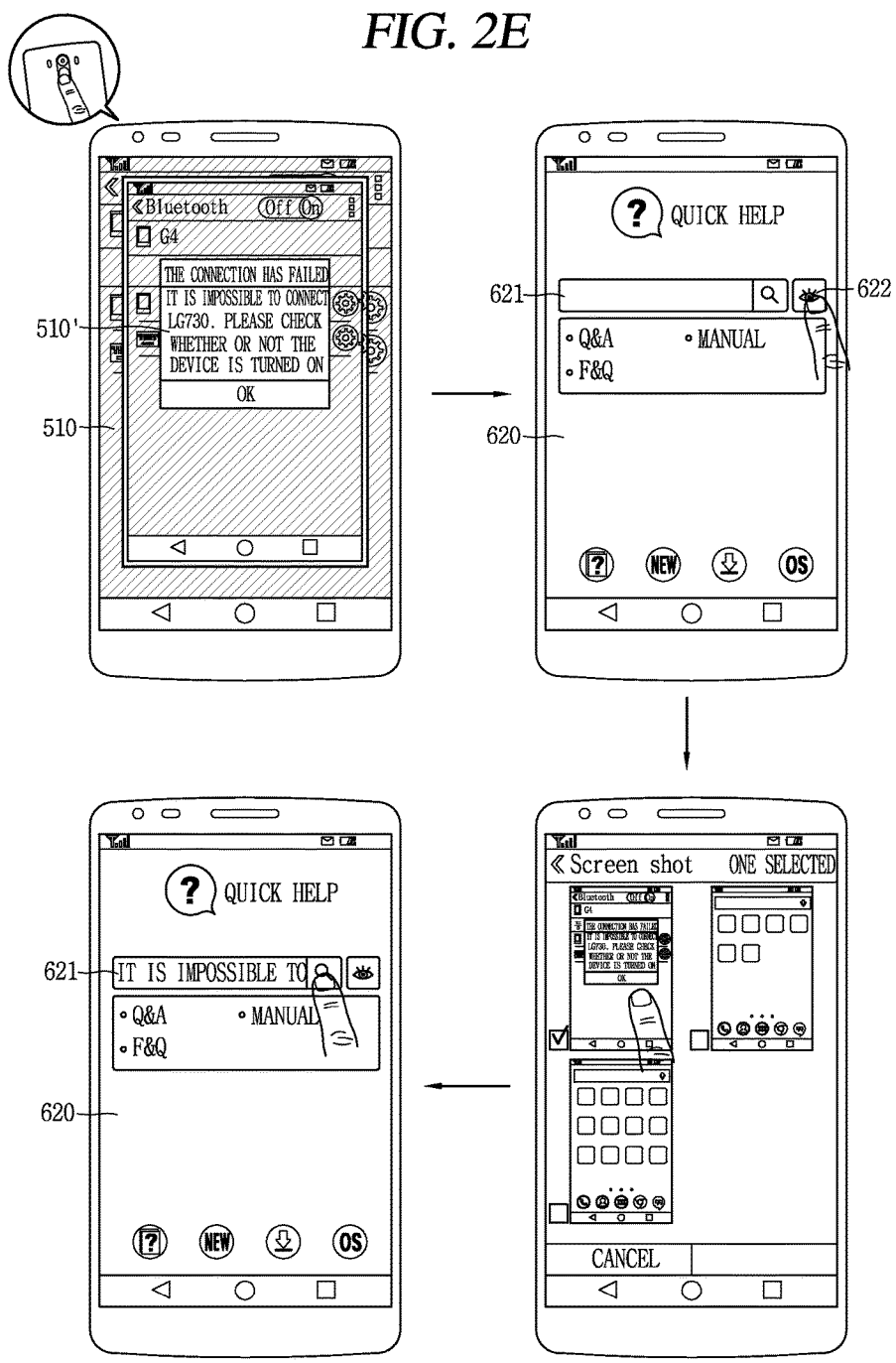

Referring to FIG. 2E, after the capture image 510' is stored in the memory 170, a specific application may be executed by the user. The execution screen 620 may include an image icon 622 for selecting stored images as a search target. The image icon 622 may be output adjacent to an input window 621 for the user to input a search term in the form of text.

The controller 180 controls the display unit 151 to output a plurality of images stored in the memory 170, in response to a touch applied to the image icon 622. The controller 180 may selectively extract from the memory 170 at least some of a captured image of a screen output on the display unit 151, an image stored when it is determined that an error has been generated, and an image stored together with error information, and output the extracted at least some of those images on the display unit 151.

Or, the controller 180 may execute another application (e.g., a gallery application) that stores the images.

The controller 180 may extract text from the image selected from the plurality images and input the extracted text on the input window 621.

According to this embodiment, the user may capture and store an image output on the display unit when an error is generated, and then select the stored image after a specific application is executed. The user may store error-related information and then solve the error through the specific application after a lapse of time.

The foregoing description has been given of a control method of providing an execution icon of an application for solving an error when the error is determined to have been generated. Hereinafter, description will be given of a control method of providing guide information for solving an error while providing screen information.

FIGS. 3A to 3D are conceptual views illustrating a control method of providing guide information upon a generation of an error in accordance with various exemplary embodiments of the present invention.

Figure 3A:
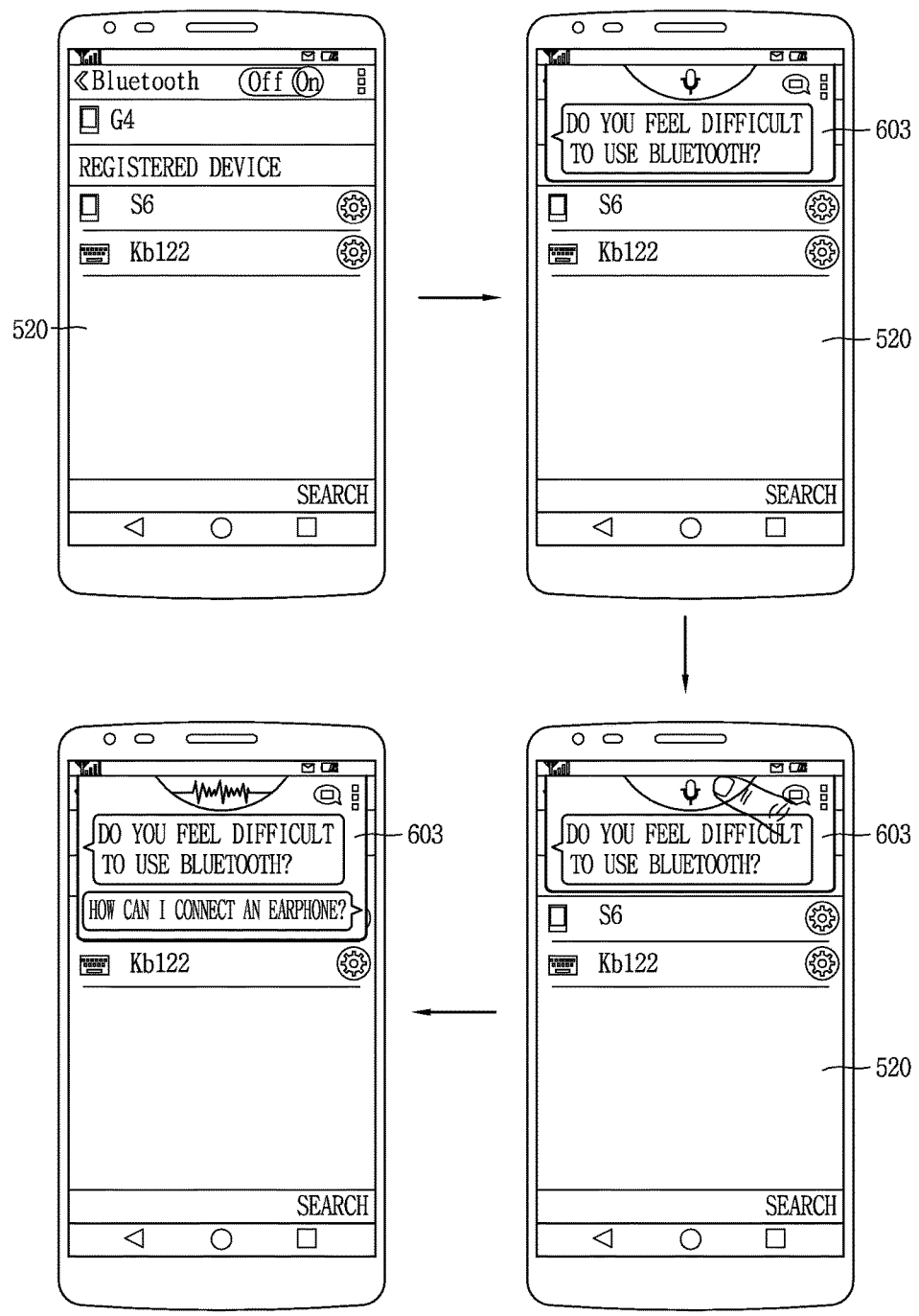
FIGS. 3A to 3D are conceptual views illustrating a control method of providing guide information upon a generation of an error in accordance with various exemplary embodiments of the present invention.

As illustrated in FIG. 3A, while screen information 520 related to a specific function is output on the display unit 151, the controller 180 may determine that an error has been generated. For example, the controller 180 may determine that the error has been generated when the screen information 520 is repetitively output, when the screen information 520 is continuously output for a preset time, or when a notification window including an error message is output.

The controller 180 may execute the specific application immediately when the error is generated. The controller 180 may activate the microphone 122 to receive a user voice in response to the execution of the specific application. When the application is executed, the display unit 151 outputs a guide image 603 on one area of the screen information 520. The guide image 603 may include a text for the user to check whether or not an error has been generated from the specific function. Also, the controller 180 may control the audio output module 152 to output a voice signal for checking the generation or non-generation of the error. The voice signal may correspond to a voice into which the text is converted.

While the guide image 603 is output on the display unit 151 in response to the execution of the specific application, a user's touch is applied to the display unit 151. This may allow the user to continuously control the specific function by applying a touch to the display unit 151 while the guide image 603 is output. The guide image 603 may be displayed at an upper end of the screen information 520 but may not be limited thereto. That is, the guide image 603 may be output on one area of the screen information 520 but preferably output in a semitransparent state such that the screen information 520 is visible through the guide image 603. The guide image 603 may change in size based on guide information provided thereby.

The microphone 122 receives the user's voice during the execution of the specific application. For example, the controller 180 may activate the microphone 122 in response to a touch applied to the guide image 603, and recognize the user's voice through a natural language recognition function. The display unit 151 may output the text, which is obtained by processing the voice received through the microphone 122 through the natural language recognition, in the guide image 603.

The controller 180 searches for error data for solving the generated error using the text according to the user's voice, and outputs at least part of the error data. The audio output module 152 may output the at least part of the error data in the form of a voice signal, and the display unit 151 may output the at least part of the error data in the form of the text information.

Although not illustrated in detail, the controller 180 may terminate the application for solving the error in response to a preset touch applied to the guide image 603.

Figure 3B:
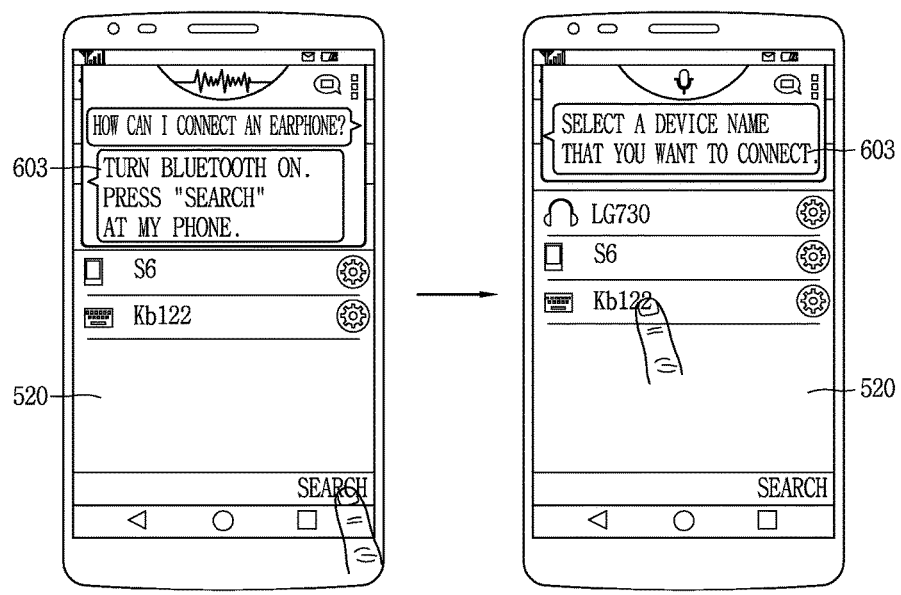

Referring to FIG. 3B, the controller 180 may provide sequential guide information according to control steps of the specific function. The controller 180 may control the currently-executed specific function, in response to a touch applied to the display unit 151 while the guide image 603 is output on one area of the display unit 151. Accordingly, the user can apply a control command on the basis of the guide image 603 output on the display unit 151 or a guide voice output through the audio output module 152.

The controller 180 controls the specific function based on the control command and outputs additional guide information on the guide image 603 based on the user's voice input and the control state by the control command. Also, the audio output module 152 may output a voice signal for the additional guide information.

Although not illustrated in detail, when a function activated according to a voice signal that the user has initially input is determined to have been performed, the controller 180 may terminate the specific application. Accordingly, the guide image 603 output on the display unit 151 may disappear.

Also, after the guide image 603 disappears, the display unit 151 may further output an icon that receives a touch for terminating the activated application. In this instance, the user may terminate the output of the guide information before completion of the specific function input through the voice.

According to this embodiment, the user can be provided with guide information which helps a control operation while viewing currently-controlled screen information. Also, the user can perform used functions step by step while continuously viewing the guide information. The user may thus immediately execute a desiring function without having to write or remember the guide information.

Also, error-related information can be input through a voice, which may result in solving a generated error even without inputting text or terms on screen information.

Figure 3C:
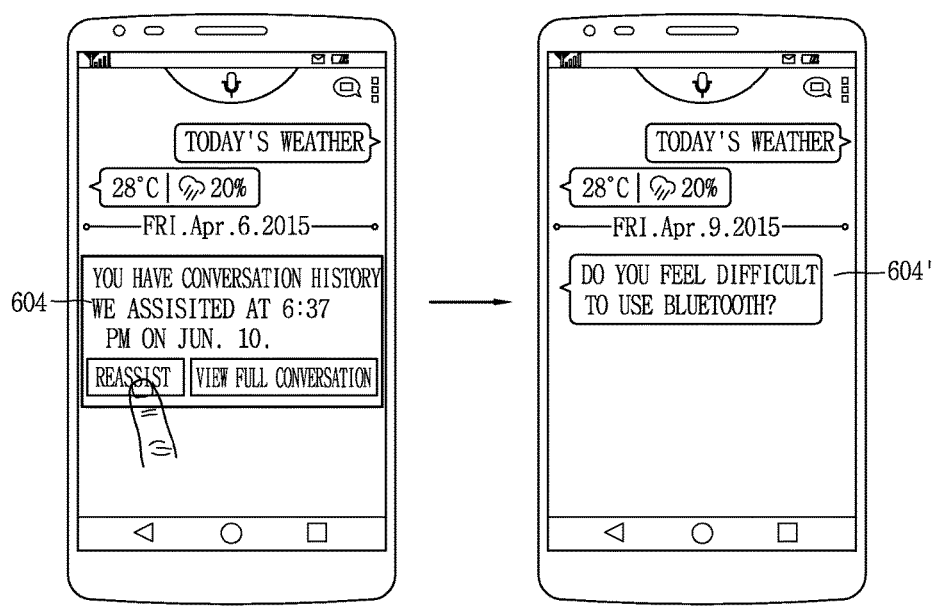

Referring to FIG. 3C, when a voice recognition application for performing a desired function by inputting a voice is executed, the controller 180 may control the display unit 151 to output previously-output guide information 604.

When the voice recognition application is executed due to an error generation, the controller 180 may control the memory 170 to store the output guide information.

The controller 180 may search for the guide information stored in the memory 170, based on the specific function that is executed while running the voice recognition application. The guide information may include information related to a control method for solving an error associated with the specific function.

The controller 180 controls the display unit 151 to output notification information 604' related to the searched guide information 604. The notification information 604' may include a stored (saved) date of the guide information, a description (keyword) of the function associated with the guide information, and a graphic image to receive a touch for outputting the guide information. The controller 180 may provide information related to sequential control steps for executing the specific function or full (entire) data that the user's voice signal input and generated guide information are sequentially arranged, on the basis of a user selection. The full data may be output in the form of text information on the display unit 151.

The controller 180 may control the display unit 151 and the audio output module 152 to sequentially provide control steps for controlling the specific function associated with the guide information.

According to this embodiment, when a voice recognition application is executed by a user during an execution of a specific function, error data which has been provided to the user may be provided so as to fast solve an error of the specific function.

Figure 3D:
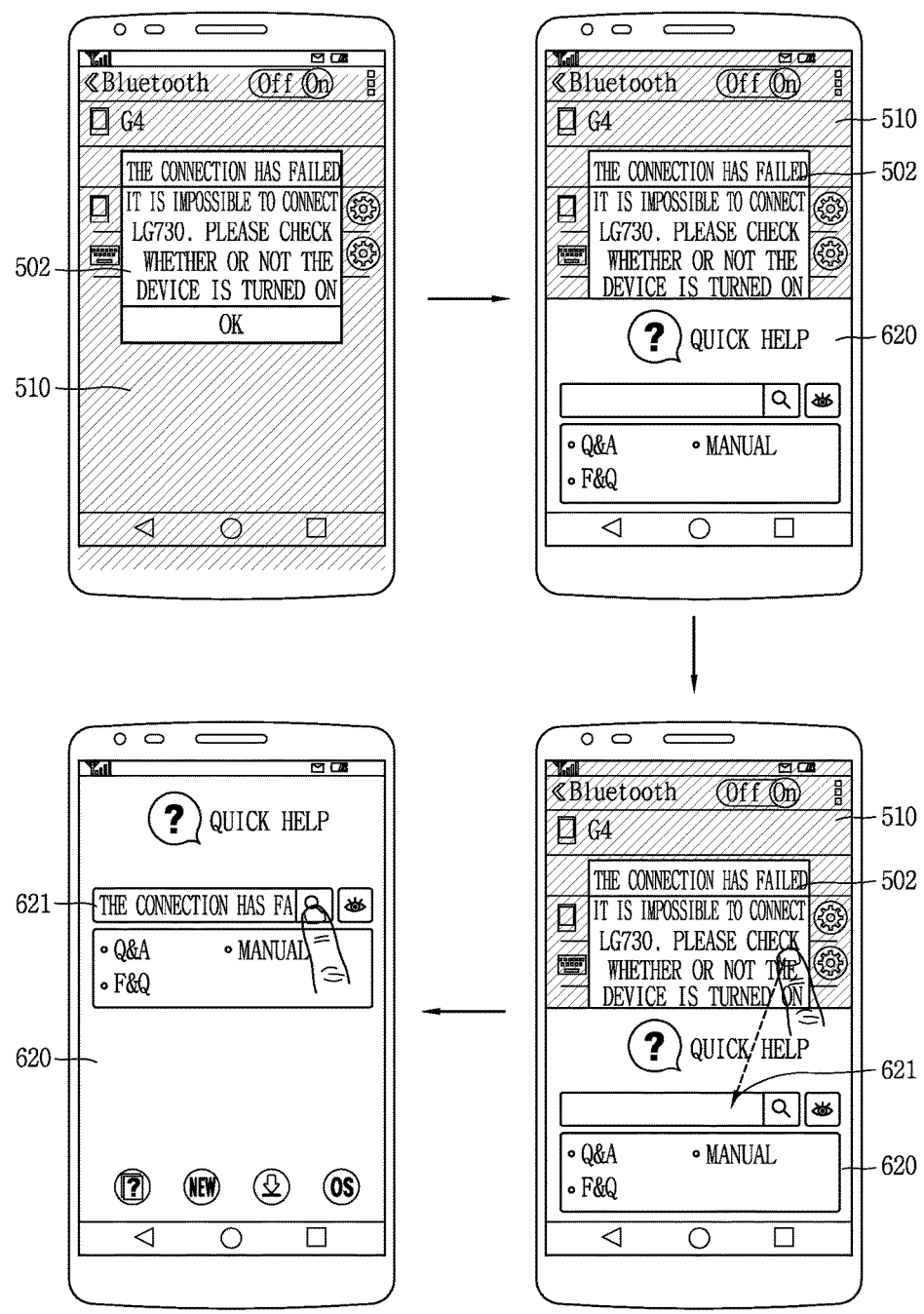

Referring to FIG. 3D, the controller 180 controls the display unit 151 to output a notification window 502 to notify an error that has been generated during the execution of the specific function. The controller 180 determines that the error has been generated when the notification window 502 is output and thus executes a specific application.

In response to the execution of the specific application, the controller 180 controls the display unit 151 to output an execution screen 620 on one area of the display unit 151. For example, the display unit 151 may be divided such that the screen information 510 and the execution screen 620 may be output together or the execution screen 620 may be output in a semi-transparent state.

The controller 180 may adjust a size of the execution screen 620 or terminate the application, in response to a touch applied to an edge of the execution screen 620. The execution screen 620 may include at least one graphic image to receive a touch for providing error data, and an input window 621 for the user to input information related to the error.

The controller 180 extracts terms associated with the error included in the notification window 502, in response to a continuous touch that is initially applied on the notification window 502 and then released on the execution screen 620.

The controller 180 controls the display unit 151 to output the extracted terms on the input window 621 when the continuous touch (drag & drop) is released. The display unit 151 controls the display unit 151 to fully output the execution screen 620 when the terms extracted are input on the input window 621.

Or, when a touch is applied to the screen information 510, the controller 180 may extract the terms included in the screen information 510 and input the extracted terms on the input window 621. In this instance, the controller 180 may set a select range on the screen information 520 by the user's touch input.

While the terms are output on the input window 621, the controller 180 may perform a desired function (e.g., error-related search, providing a manual, searching for question and answer for the error, etc.) of the specific function.

Meanwhile, when the terms are not extracted from the notification window 502 or when a text input is incapable on the input window 621, the controller 180 may control the display unit 151 to maintain the simultaneously-output state of the screen information 520 and the execution screen 620.

According to this embodiment, when an error is generated, a user can immediately be provided with an execution screen of an application for solving the error. Also, the user may be allowed to input error information desiring to search for on the basis of a simple touch input.

Figure 4A:
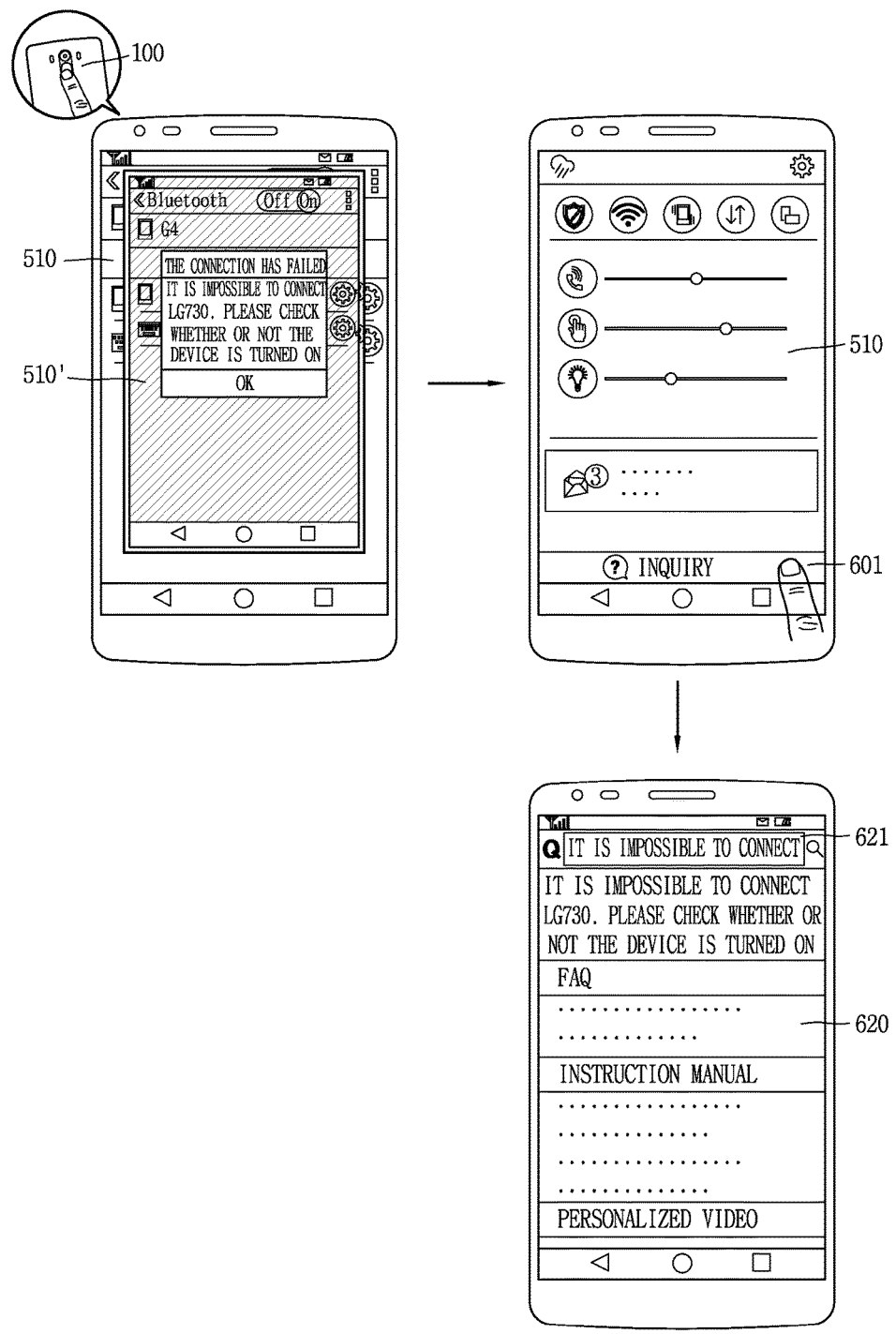
FIGS. 4A to 4C are conceptual views illustrating a method of providing error data using a capture image.
Figure 4B:
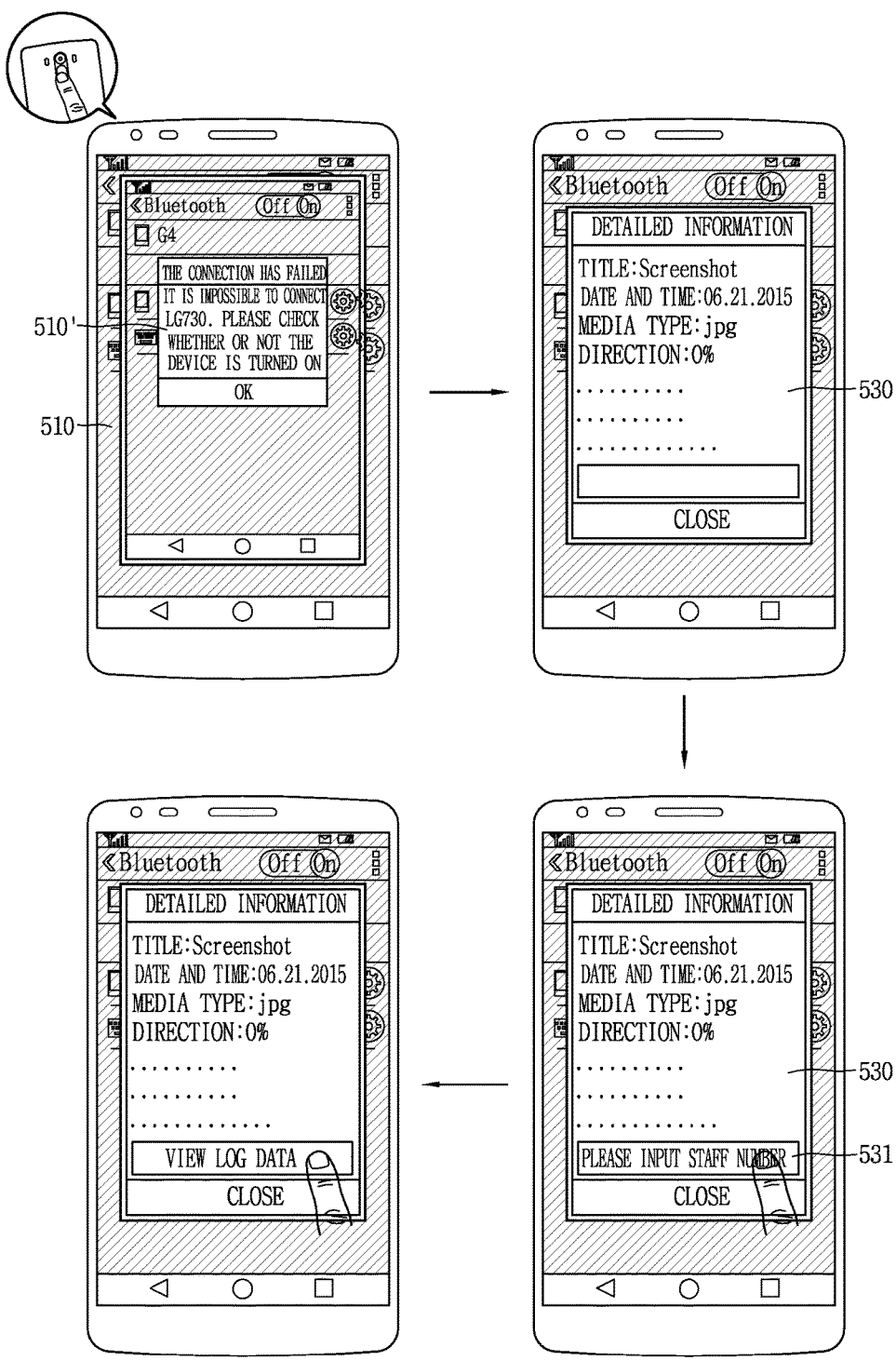
Figure 4C:
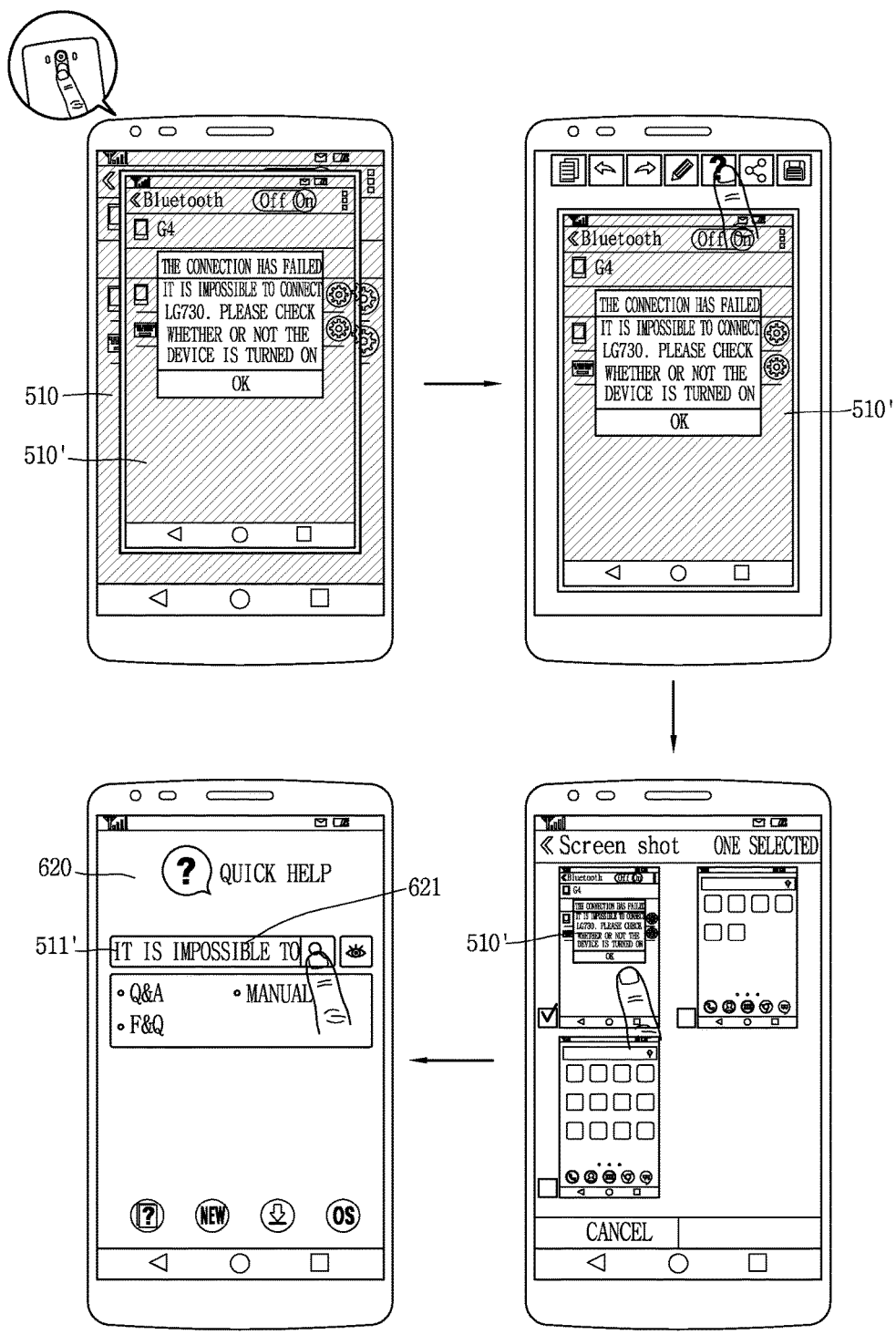

FIGS. 4A to 4C are conceptual views illustrating a method of providing error data using a capture image.

As illustrated in FIG. 4A, while a notification window notifying the generated error is output, the controller 180 captures the screen information 510 including the notification window based on a control command for capturing an image output on the display unit 151. The controller 180 controls the memory 170 to store a capture image 510' of the screen information 510.

The controller 180 controls the display unit 151 not to display the notification window any more based on the control command. The display unit 151 outputs only the screen information 510 of the specific function, and receives a user's touch for controlling the specific function. However, in this instance, the display unit 151 outputs a first icon 601 for receiving a touch for providing error data associated with the previously-generated error.

When the touch is applied to the first icon 601, the controller 180 extracts a text from the capture image 510'. The controller 180 then executes a specific application for solving the error and controls the display unit 151 to output an execution screen 620. The execution screen 620 includes an input window 621 for receiving an input of a search term. The controller 180 inputs the extracted text as the search term and executes a search.

Meanwhile, the controller 180 may control the screen information based on a touch applied to the screen information 510 output along with the first icon 601. The controller 180 may control the display unit 151 not to display the first icon 601 when the screen information 510 changes in response to the touch.

According to this embodiment, when an error is generated, the user may first store the generated error as an image and solve the error in a different manner before searching for error data. However, if the different manner is unknown or the error is not solved, the user can apply a touch to the icon so as to receive the error data using the stored image.

Referring to FIG. 4B, the controller 180 stores the screen information as the capture image 510' and also stores operation log information on the mobile terminal 100 while the screen information 510 is output. Here, the operation log information may correspond to a server accessed by the user, information related to data transmitted and received by the user using a wireless signal, information related to stored data and the like.

When the capture image 510' is generated, the controller 180 controls the display unit 151 to output detailed information (e.g., stored time, size, type of media, etc.) 530 related to the capture image 510'. However, in this instance, the operation log information is not output.

When a specific signal is input or an entrance into a specific space of the mobile terminal is sensed, the controller 180 may activate an input window 531 for the user to input password information for outputting the log information. For example, the specific space may correspond to a service center of a manufacturer which serves to repair the mobile terminal and the like, but the present invention may not be limited to this. Also, the password information may correspond to identification information related to a staff of the service center. Or, the user may input user-set password information on the input window 531.

The controller 180 may control the display unit 151 to output the log information along with the detailed information based on the password information.

According to the present invention, a problem of violation of privacy that log information generated during use of a user's mobile terminal can be solved and possibility of solving an error can increase by providing the log information only to a service center of a manufacturer.

Referring to FIG. 4C, the controller 180 generates the capture image 510' based on a control command for capturing the screen information output on the display unit 151. The display unit 151 outputs a plurality of icons for editing and storing the capture image 510'. The plurality of icons may include an error icon for storing the capture image 510' together with error information.

The controller 180 may store the capture image 510' together with information related to a currently-executed specific function, in response to a touch applied to the error icon. The capture image 510' is stored along with other images. For example, the display unit 151 may output thumbnail images corresponding to images stored in the memory 170 and the capture image 510'.

The controller 180 may fully output an image stored in the memory 170 on the display unit 151, in response to a touch applied to a thumbnail image of the image. However, the controller 180 executes a specific application for solving the error, in response to a preset touch input applied to the capture image 510', and outputs an execution screen 620. That is, the controller 180 may execute the specific application when a selected image is stored along with a specific function or specific error information.

The controller 180 may allow the user to input the extracted text from the capture image 510' or to input information related to the specific function stored along with the image or error information, on the input window 621 of the execution screen 620.

According to this embodiment, when an error is generated, the user may store the generated error as a capture image, and more conveniently execute an application for solving the error using the stored capture image.

Figure 5:
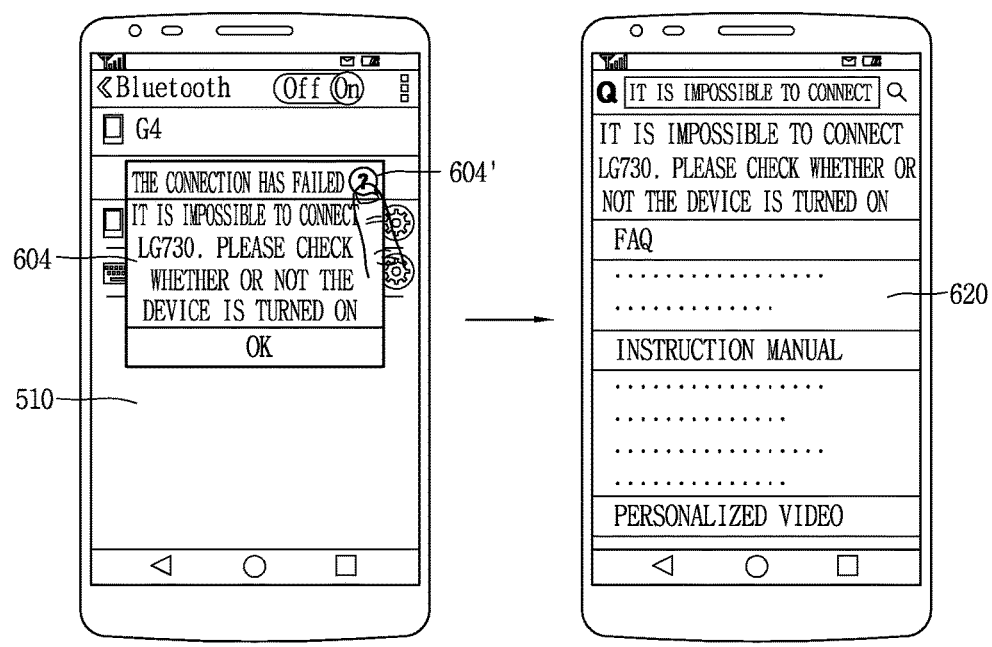
FIG. 5 is a conceptual view illustrating a control method of executing a specific application in accordance with another exemplary embodiment of the present invention.

FIG. 5 is a conceptual view illustrating a control method of executing a specific application in accordance with another exemplary embodiment of the present invention.

When an error is generated, the display unit 151 outputs a notification window 604 to notify the generated error. The notification window 604 may include an icon 604' corresponding to an application for providing error data. The controller 180 executes the application in response to a touch applied to the icon 604', and controls the display unit 151 to output a text included in the notification window 604 on the execution screen 620. The controller 180 extracts the text included in the notification window 604 and executes a search by inputting the extracted text as a search term.

Although not illustrated, when a plurality of notification windows are output on the display unit 151, each notification window may include the icon. In this instance, the user can be provided with error data for each error information by applying a touch to the one icon. This may allow the user to individually check the error data for each notification window.

FIGS. 6A to 6D are conceptual views illustrating a control method of providing error data in accordance with different exemplary embodiments of the present invention.

Figure 6A:
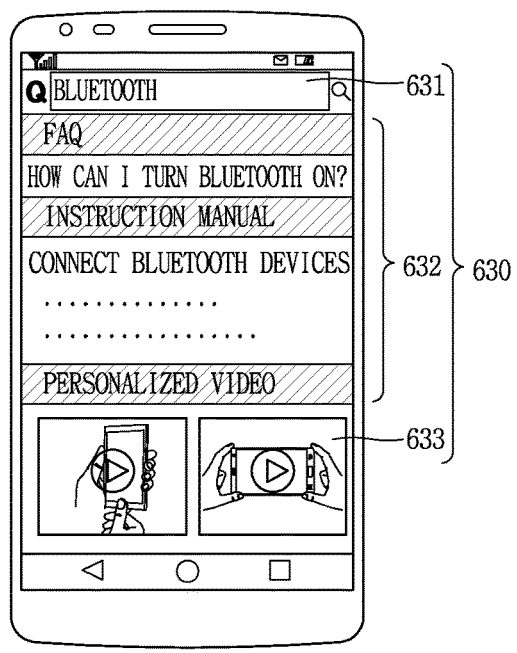
FIGS. 6A to 6D are conceptual views illustrating a control method of providing error data in accordance with different exemplary embodiments of the present invention.

As illustrated in FIG. 6A, an execution screen 630 of the application includes an input window 631 on which the error information is input as a search term. A text may be input on the input window 631. The text may correspond to a text extracted from a notification window notifying screen information corresponding to a specific function or the error information, or may be input by a user. Even when the text extracted by the controller 180 is output on the input window 631, the text may be modified by the user.

The execution screen 630 includes a first area 632 and a second area 633. The first area is provided with a first search result including prestored questions and answers thereof, searched by the search term, and a second search result including an instruction manual for a specific function, searched by the search term. Also, the second area 633 includes video information.

The video information may correspond to a specific server, for example, a server of a manufacturer that has fabricated the mobile terminal. Or, the controller 180 may perform a web search using the search term. Accordingly, videos associated with similar errors, which have been uploaded by other users, can be provided.

Figure 6B:
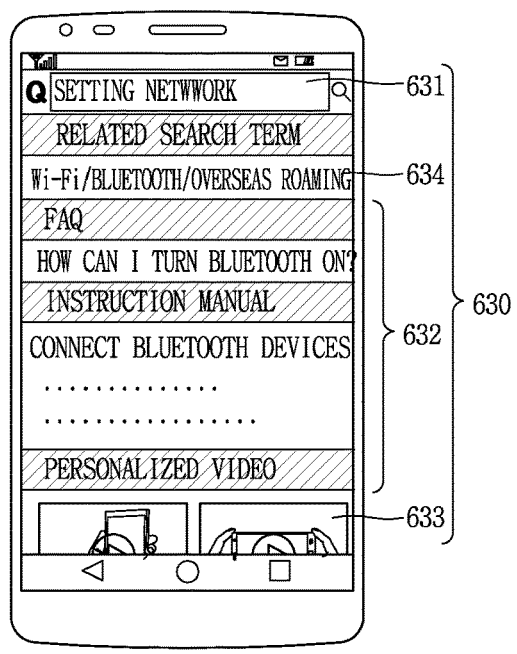

Referring to FIG. 6B, the controller 180 may provide related search terms 634. The related search terms 634 may provide a text related to the error as well as a text similar to the text input on the input window 631.

Accordingly, errors which are caused during extraction of a text from an image can be reduced. When the user fails to search for desiring error data, more data can be researched more fast.

Figure 6C:
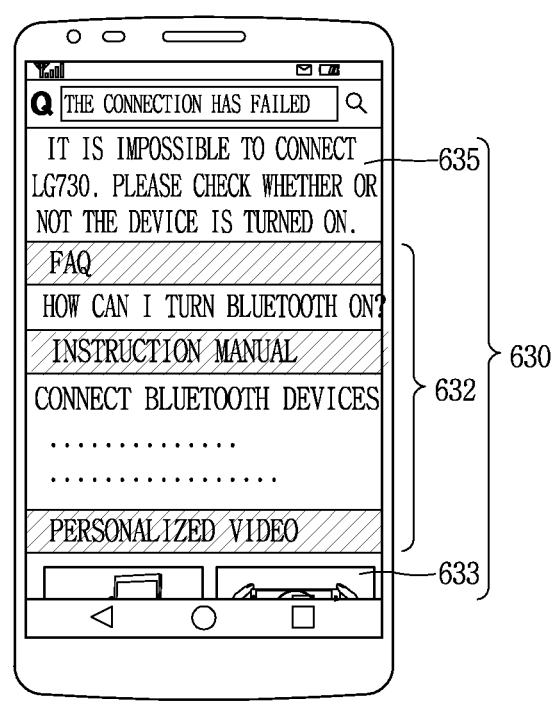

Referring to FIG. 6C, the controller 180 may generate the search term by extracting a part of the text extracted from the image. For example, when the text is extracted on the sentence basis from the image by the controller 180, an answer 635 that highly matches the extracted sentence may be output on a top of the execution screen. For example, the answer 653 may correspond to error data including the extracted sentence. In this instance, there is no limit to a category of the answer with the highest matching value.

Figure 6D:
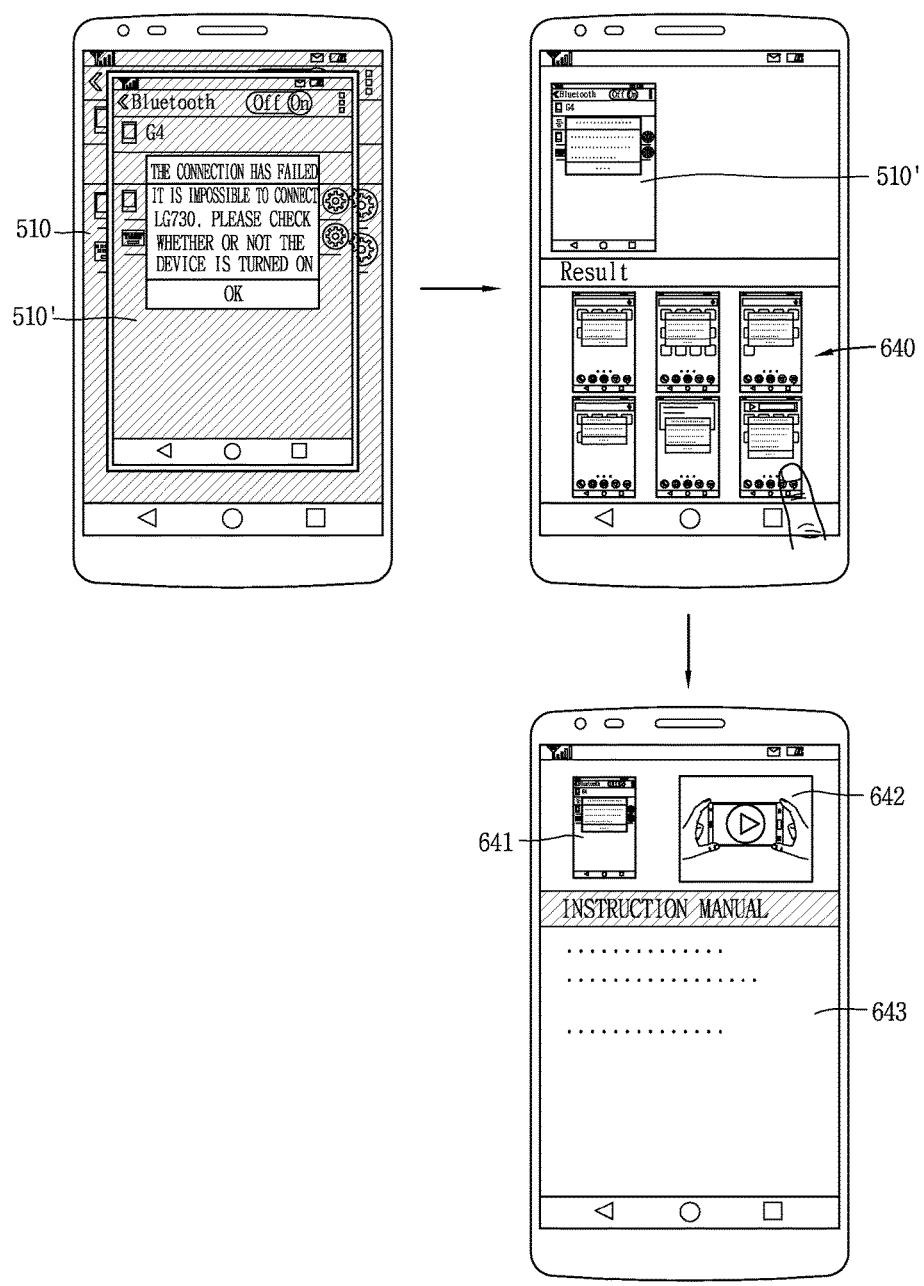

Referring to FIG. 6D, when the capture image 510' is generated, the controller 180 searches for at least one image 640, which is the same as at least one portion of the capture image 510' and thus is accepted as similar to the capture image 510', and outputs the searched at least one image 640. The at least one image 640 corresponds to an image related to the error data. For example, when a touch is applied to the at least one image 640, an instruction manual 643 and video information 642 may be output.

The at least one image may correspond to an image included on the instruction manual, a thumbnail image of a video file and the like.

According to this embodiment, the user can more fast search for desired error data based on image similarity, without a step of extracting a text from the image.

Figure 7A:
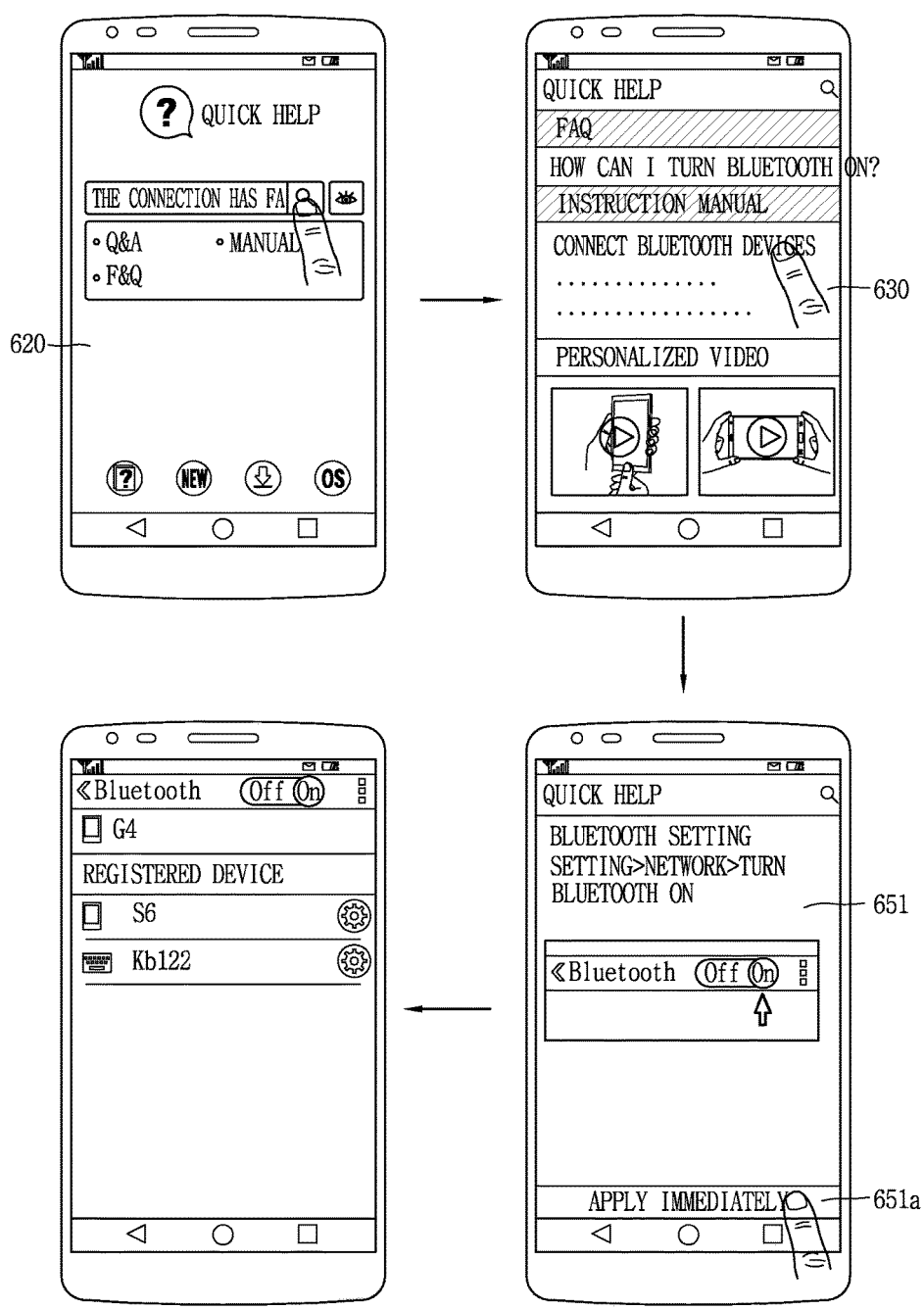
FIGS. 7A and 7B are conceptual views illustrating a control method of providing guide information.
Figure 7B:
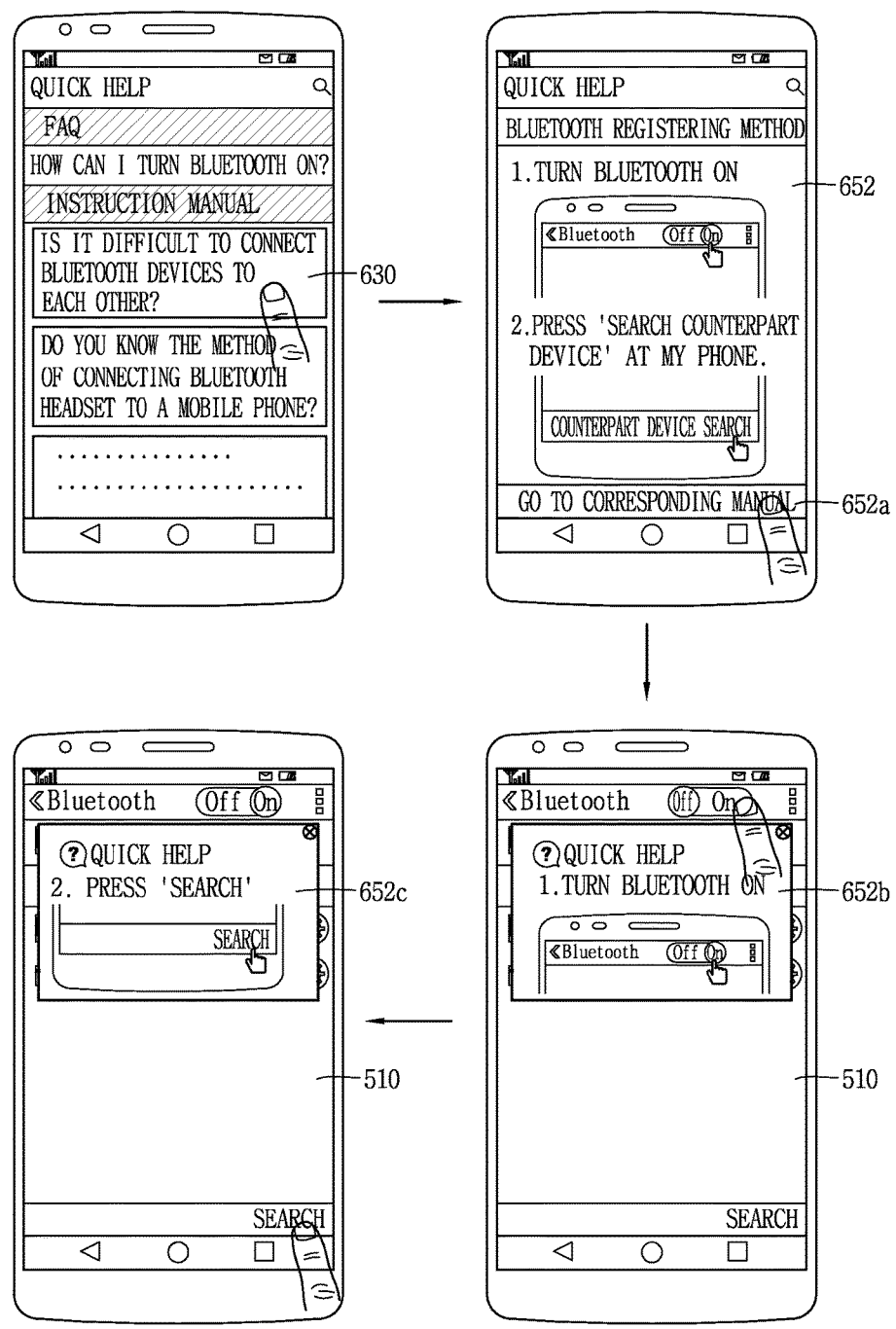

FIGS. 7A and 7B are conceptual views illustrating a control method of providing guide information.

As illustrated in FIG. 7A, the controller 180 outputs an execution screen 630 including error data based on a search term by error information previously included on an execution screen 620.

The controller 180 controls the display unit 151 to output a first guide screen 651, in response to a touch for selecting one error data. For example, when an instruction manual is selected by the touch input, the guide screen may include the instruction manual output in a sequential manner.

Meanwhile, when error data that is formed as a video is selected, the first guide screen 651 may be a video screen that is reproduced. However, the video according to this embodiment preferably corresponds to a video screen provided from a service server of the mobile terminal.

The first guide screen 651 may include an application icon 651a that receives a touch for controlling the mobile terminal based on error data. The controller 180 controls the mobile terminal to perform control steps included in the error data, in response to a touch applied to the application icon 651a.

Or, the controller 180 may perform a user-desired control step using both of the input error information and the error data. For example, when a step of selecting one of a plurality of contents is included in the control steps, the controller 180 may select a content matching the error information.

Or, when a step requiring for a user input is included, the controller 180 may stop the performing of the control steps and control the display unit 151 to output notification information to the user. The display unit 151 may output a result screen when the control steps are completely performed.

According to this embodiment, the user can fast perform a desired control step without having to read all of error data. Although not illustrated in detail, the controller 180 may control the display unit 151 to sequentially output screen information indicating the control steps. Or, the controller 180 may perform the control steps while the user runs another application, and control the display unit 151 to output a completion message when the control steps are completely performed.

Referring to FIG. 7B, the controller 180 controls the display unit 151 to output a second guide screen 652, in response to a touch applied on the execution screen 630 including the error data. The second guide screen 652 includes a guide icon 652a for outputting the error data in a sequential manner.

The controller 180 sequentially outputs the error data based on a touch applied to the guide icon 652a. The controller 180 divides the error data for each control step and sequentially outputs some of the divided error data. While first divided error data 652b is output, the display unit 151 receives a touch input. The controller 180 changes the screen information 510 based on the touch input.

The first error data 652b may be output in a semitransparent state such that the screen information 510 can be viewed therethrough. Also, the controller 180 may stop the output of the error data based on a touch applied to the first error data 652b.

When the screen information 510 changes, the controller 180 controls the display unit 151 to output second error data 652c corresponding to the next control step of the first error data 652b.

Although not illustrated in detail, the controller 180 may control the audio output module 152 to output the error data in the form of a voice signal.

Figure 8A:
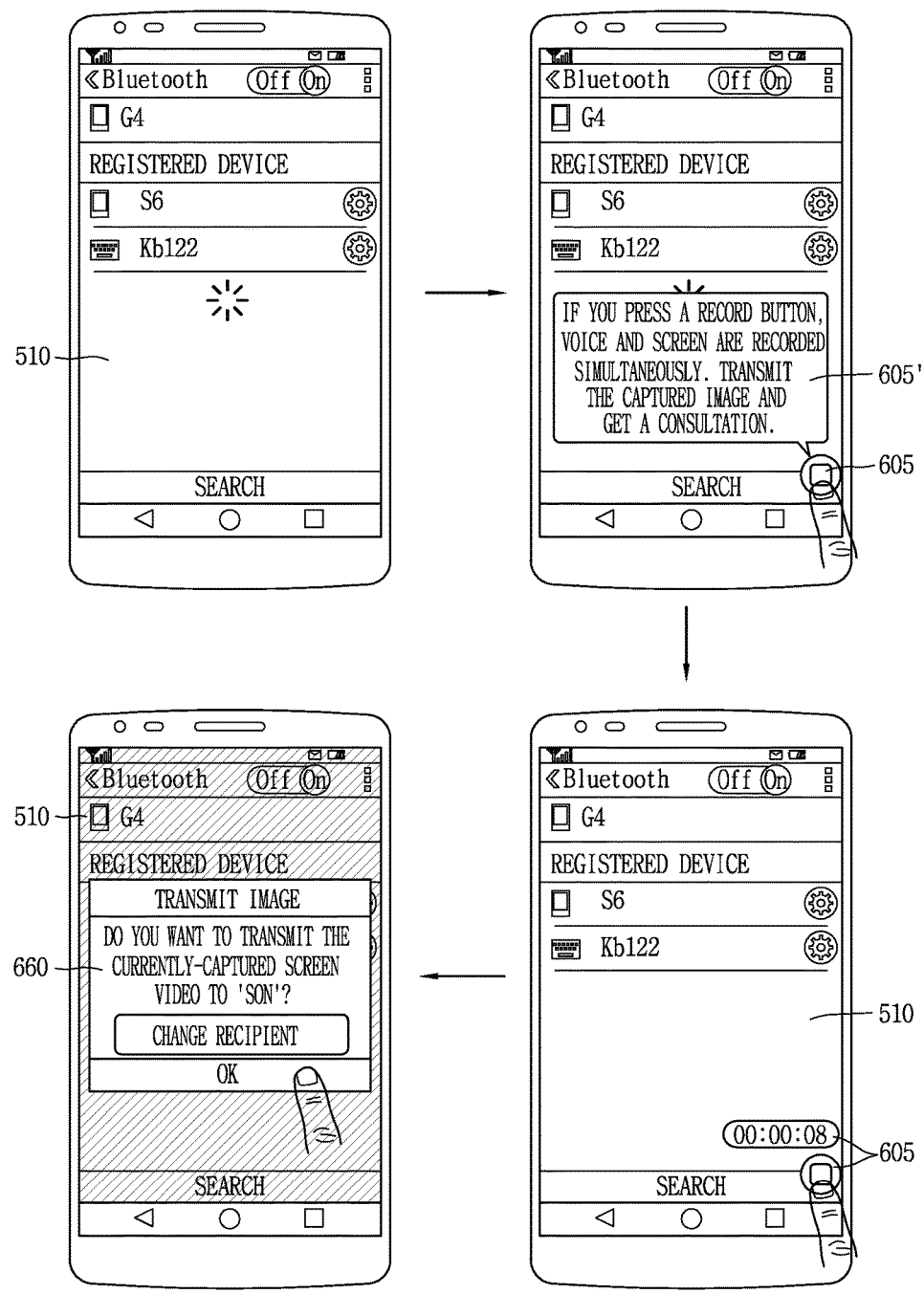
FIGS. 8A to 8C are conceptual views illustrating a control method of storing error information in real time.
Figure 8B:
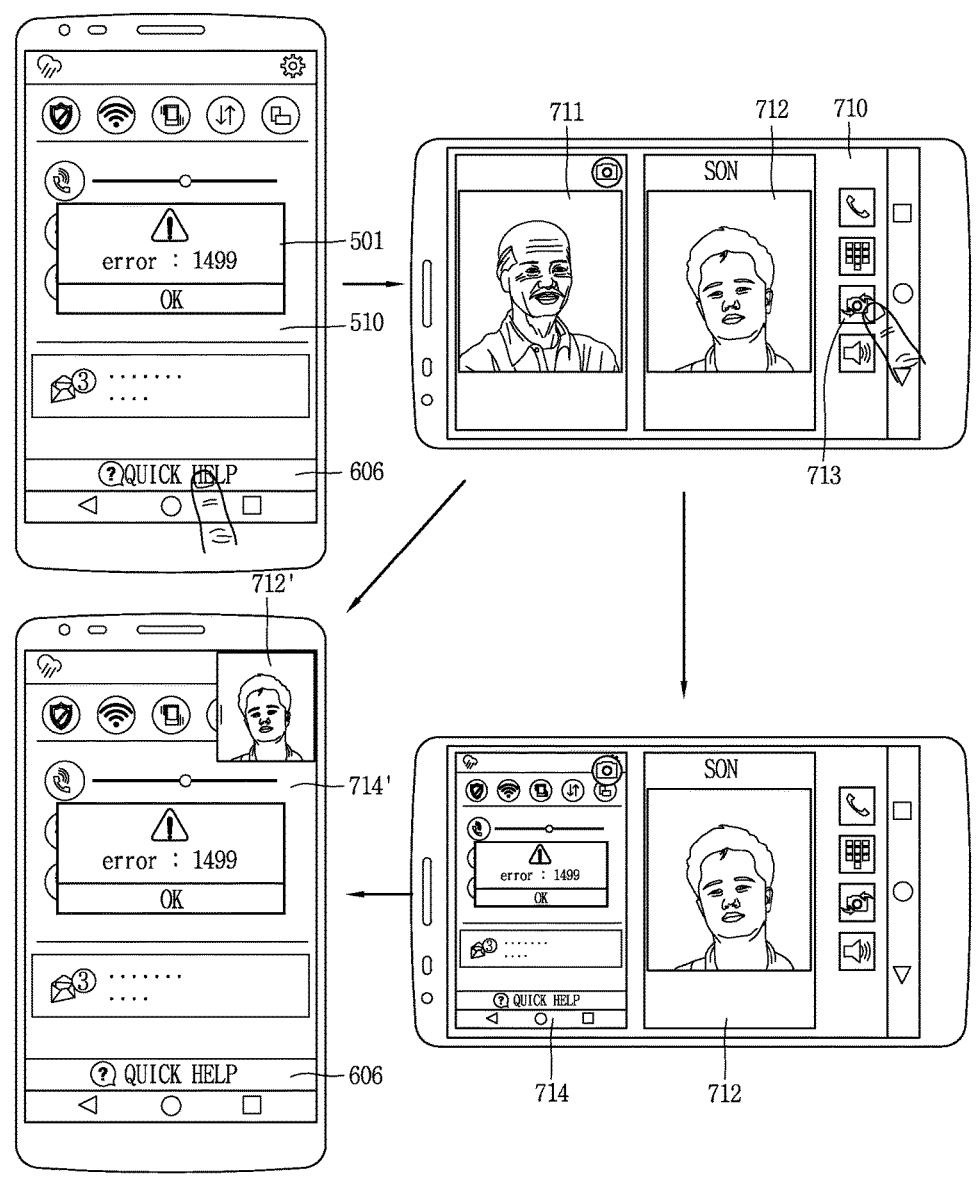
Figure 8C:
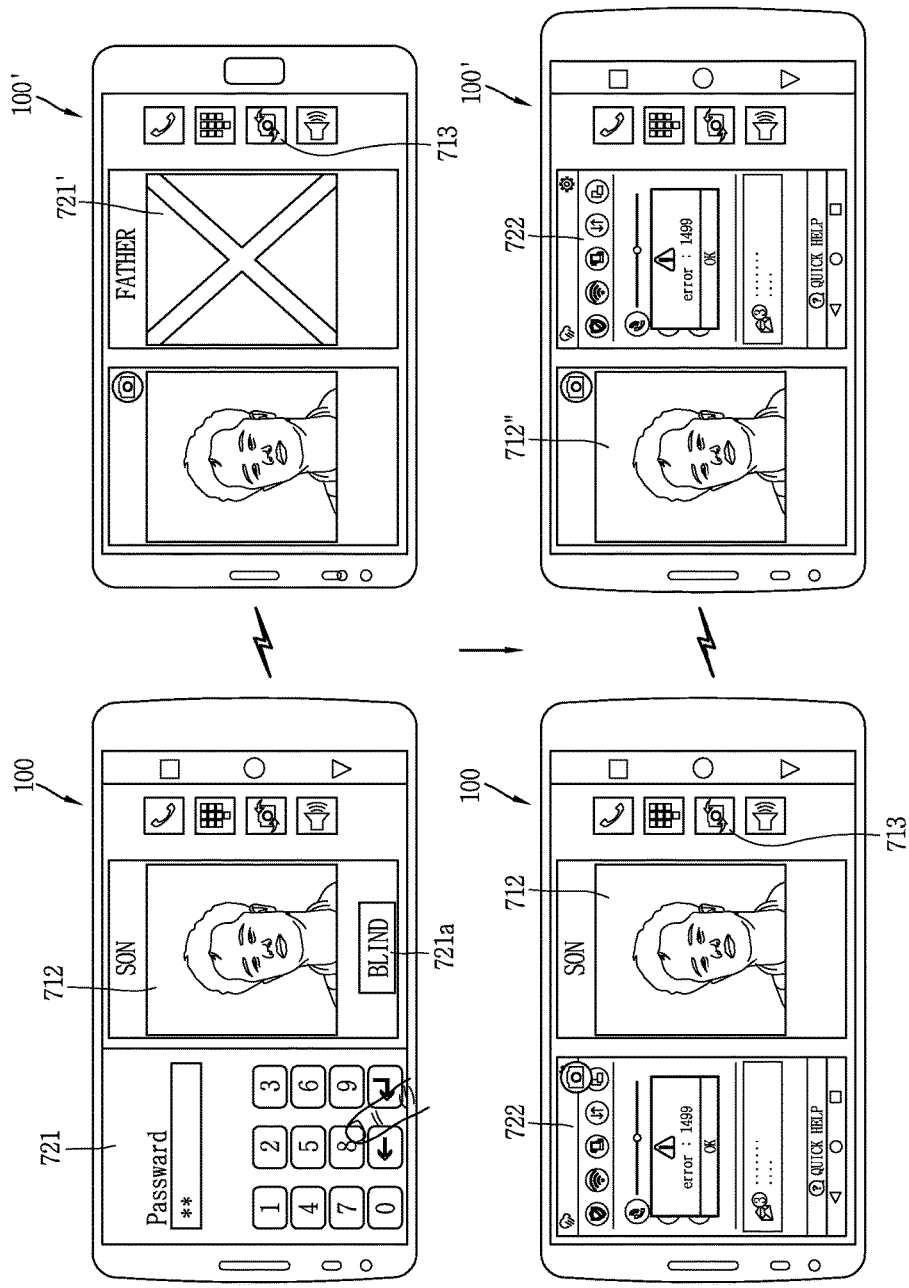

FIGS. 8A to 8C are conceptual views illustrating a control method of storing error information in real time.

As illustrated in FIG. 8A, when an error is determined to have been generated during an execution of a specific function, the controller 180 controls the display unit 151 to output a record icon 605. For example, the controller 180 may determine that the error has been generated when substantially the same screen information is repetitively output, when a notification window notifying an error generation is output, and when an expected control command has not been applied for a preset time.

The record icon 605 may be disposed on one area of the display unit 151, and its output position may change according to configurations included in screen information. In addition to the record icon 605, the display unit 151 may output an instruction window 605' including a description that the changes in the screen information output on the display unit 151 are stored (recorded) according to a lapse of time. The instruction window 605' may be output only for a preset time (several seconds) according to a user setting.

The controller 180 controls the memory 170 to store (record) changes in the screen information output on the display unit 151, in response to a touch applied to the record icon 605. During recording of the changes in the screen information, the display unit 151 receives a touch input and a specific function corresponding to the screen information is controlled based on the received touch input.

The display unit 151 may also output a lapse of time, starting from a record-starting time point, along with the record icon 605. When a touch is applied to the record icon 605 again, the recording of the changes in the screen information is terminated.

The controller 180 controls the memory 170 to store the recorded file. The memory 170 may temporarily store the recorded file and also store information related to the executed specific function and the user's log information.

When the record file is completely produced, the display unit 151 outputs a confirm window 660 for the user to confirm whether or not to transmit the completed recorded file to an external device. Accordingly, the user can transmit the recorded file immediately to the external device or share it in a server.

According to the present invention, since a process that an error is generated may be stored according to the lapse of time, controls performed by the user can be sequentially stored. This may result in facilitating for recognizing a cause of an error.

As illustrated in FIG. 8B, when the error is determined to have been generated, the controller 180 controls the display unit 151 to output a third icon 606. The controller 180 transmits a request signal for a video call to a preset external device in response to a touch applied to the third icon 606.

Or, a video call function may be executed and a list for selecting an external device to which a request signal has been transmitted may be output, in response to a touch applied to the third icon 606.

When the video call is connected, the controller 180 outputs a call screen 710 including information related to the video call. The display unit 151 is divided into first and second areas, and outputs a first image 711 as a captured image (or a prestored image) of the user, and a second image 712 as a captured image (or a prestored image) of another party (callee) on the divided first and second areas, respectively.

The call screen 710 includes a switching icon 713 for selecting one camera for capturing the user's face from the first and second cameras 121a and 121b. When a plurality of touches are applied to the switching icon 713, the controller 180 determines that an error has been generated and controls the display unit 151 to output previously-output screen information 714 on the first area.

The controller 180 controls the screen information 714 based on the touch applied to the first area, and controls the wireless communication unit 110 to continuously transmit changes in the screen information 714 to the external device.

Accordingly, the another party can be provided in real time with the screen information, which is currently output on the first area of the display unit 151 of the mobile terminal, other than capturing the user's face (or a subject captured through a camera).

Or, the controller 180 may output screen information 714' fully on the display unit 151. A varied image 712' of the second image may be output on one area of the display unit 151. Even in this instance, the screen information may vary in response to the user's touch inputs and the variation of the screen information is transmitted to the external device in real time.

Meanwhile, the call screen 710 includes a control icon separate from the switching icon 713, and the screen information may be transmitted to the external device based on the control icon.

According to this embodiment, since an image on which screen information changes can be transmitted to an external device in real time during a video call, the user can be provided with information for solving an error in real time from another party. Also, an icon for immediately placing a call when an error is generated, and thus the user can easily ask for help even when the user does not know a control method at all.

Referring to FIG. 8C, when an input of password information for executing the specific function is needed, the controller 180 outputs a security input screen 721 on the first area. While the security input screen 721 is output on the display unit 151 and the user inputs the password information on the security input screen 721, the controller 180 restricts a transmission of the security input screen 721 and controls the wireless communication unit 110 to transmit a preset security image 721'. Accordingly, the security image 721' is output on one area of the external device 100'.

A restriction icon 721a for restricting a transmission of the security input screen 721 may be output on the second area. The controller 180 may control the transmission of the security input screen 721 to be restricted only when the security information is input after a touch is applied to the restriction icon 721a.

When the security is released in response to a correct input of the security information, the controller 180 controls the wireless communication unit 110 to transit screen information 722 to the external device 100'.

According to this embodiment, the user can selectively restrict the transmission of undesired information, for example, security-related information and information that is likely to cause a violation of privacy.

According to this embodiment, the user can immediately vary and store a preview image that is obtained in real time through a camera.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display;
a memory; and
a controller configured to:
cause the display to display screen information corresponding to a specific function being executed;
recognize an error or trouble by a user that occurs during the execution of the specific function based on a specific image, keyword, or term included in the displayed screen information, or based on a usage pattern that is preset as an indication of the error or trouble;
capture an image of the screen information in response to recognition of the error or trouble;
cause the memory to store the captured image of the screen information that is associated with log information related to the specific function;
extract text related to the error or trouble from the captured image in response to a control command for searching the error or trouble;
search information related to a solution or help for the error or trouble based on the extracted text;
cause the display to display guide information for providing the solution or help for the error or trouble; and
cause the display to display the searched information related to the solution or help for the error or trouble in response to user input applied to the guide information.

2. The terminal of claim 1, wherein the controller is further configured to determine that the error or trouble has occurred when a notification window notifying the error is displayed or when the screen information is repetitively displayed in a preset pattern.

3. The terminal of claim 2, wherein:
the controller is further configured to execute a specific application for searching for data related to the error or trouble; and
the guide information is included in an execution screen of the specific application.

4. The terminal of claim 3, wherein the controller is further configured to search for the data related to the error or trouble by executing the specific application in response to a series of touch inputs received via at least one of the notification window or the guide information, the data searched based on an image of text extracted from the notification window that is set as a search term.

5. The terminal of claim 1, wherein
the error or trouble is recognized when the user feels difficulty operating the specific function, when the user fails to control the specific function in a desired way, when the terminal is in an uncontrollable state, or when an abnormal response occurs in response to a control command received while the specific function is executed.

6. The terminal of claim 3, wherein the controller is further configured to search for the data from at least one of the memory or a server.

7. The terminal of claim 1, wherein the controller is further configured to:
execute a preset application for providing data related to the error or trouble in response to a touch applied to the guide information; and
cause the display to display an execution screen of the preset application, the execution screen including an input window that is filled with a search term corresponding to the extracted text.

8. The terminal of claim 1, wherein the controller is further configured to cause the memory to store the log information generated during the execution of the specific function.

9. The terminal of claim 8, wherein the controller is further configured to:
search for a stored image that is same as or similar to at least part of the guide information;
cause the display to display the searched image; and
cause the display to display data related to the stored image in response to a touch applied to the displayed image, the displayed data providing information related to the solution or help.

10. The terminal of claim 1, further comprising a microphone, wherein the controller is further configured to:
activate the microphone to receive a user's voice; and
cause the display to display data searched based on the voice, the data providing the information related to the solution or help.

11. The terminal of claim 10, wherein the controller is further configured to cause the display to change the screen information to different screen information in response to a touch received while the guide information is displayed.

12. The terminal of claim 10, wherein the controller is further configured to:
cause the memory to store error data searched based on the voice; and
cause the display to display at least part of the error data when an additional error occurs.

13. The terminal of claim 1, wherein the controller is further configured to cause the display to display the information related to the solution or help sequentially for each control step for solving the error or trouble.

14. The terminal of claim 1, wherein the controller is further configured to perform an operation of solving the error or trouble based on the information related to the solution or help when a touch is applied to an application icon displayed along with the information.

15. The terminal of claim 1, wherein the controller is further configured to cause the memory to store changes in the screen information according to a lapse of time in response to a control command applied via the display after a touch is received via the guide information.

16. The terminal of claim 1, further comprising a wireless communication unit configured to perform wireless communication with an external device,
wherein the controller is further configured to:
execute a video call function with the external device; and
cause the wireless communication unit to transmit the screen information to the external device when the error or trouble occurs.

17. The terminal of claim 16, wherein the controller is further configured to cause the wireless communication unit to restrict the transmission of the screen information when the screen information includes a password input window for receiving password information.

18. A method for controlling a mobile terminal, the method comprising:
displaying screen information corresponding to a specific function being executed on a display;
recognizing an error or trouble by a user that occurs during the execution of the specific function based on a specific image, keyword, or term included in the displayed screen information, or based on a usage pattern that is preset as an indication of the error or trouble;
capturing an image of the screen information in response to recognition of the error or trouble;
storing, in a memory, the captured image of the screen information that is associated with log information related to the specific function;
extracting text related to the error or trouble from the captured image in response to a control command for searching the error or trouble;
searching information related to a solution or help for the error or trouble based on the extracted text;
displaying guide information for providing the solution or help for the error or trouble; and
displaying the searched information related to the solution or help for the error or trouble in response to user input applied to the guide information.

* * * * *